(12) United States Patent
Konno

(10) Patent No.: US 7,382,546 B2
(45) Date of Patent: Jun. 3, 2008

(54) ZOOM OPTICAL SYSTEM, IMAGING LENS DEVICE, AND DIGITAL APPARATUS

(75) Inventor: Kenji Konno, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 127 days.

(21) Appl. No.: 11/257,879

(22) Filed: Oct. 25, 2005

(65) Prior Publication Data

US 2006/0092524 A1 May 4, 2006

(30) Foreign Application Priority Data

Oct. 29, 2004 (JP) .............................. 2004-315771
Feb. 15, 2005 (JP) .............................. 2005-038391

(51) Int. Cl.
*G02B 15/14* (2006.01)

(52) U.S. Cl. ...................................................... 359/678
(58) Field of Classification Search ................ 359/678; 348/335
See application file for complete search history.

(56) References Cited

U.S. PATENT DOCUMENTS

| 4,398,811 | A | * | 8/1983 | Nishioka et al. ............. 359/367 |
| 5,815,326 | A | | 9/1998 | Takahashi ..................... 359/729 |
| 5,917,662 | A | | 6/1999 | Sekita ........................... 359/729 |
| 5,973,858 | A | | 10/1999 | Sekita ........................... 359/729 |
| 6,128,137 | A | * | 10/2000 | Togino .......................... 359/631 |
| 6,256,155 | B1 | * | 7/2001 | Nagaoka ....................... 359/753 |
| 6,337,776 | B1 | | 1/2002 | Kamo ............................ 359/834 |
| 6,476,851 | B1 | * | 11/2002 | Nakamura ..................... 348/65 |
| 6,560,013 | B1 | * | 5/2003 | Ramsbottom ................ 359/431 |
| 6,801,370 | B2 | | 10/2004 | Sekiyama et al. ........... 359/726 |
| 6,822,671 | B2 | | 11/2004 | Inagaki ......................... 347/258 |
| 6,850,279 | B1 | | 2/2005 | Scherling ..................... 348/335 |
| 7,142,242 | B2 | * | 11/2006 | Otake et al. ................. 348/335 |
| 2004/0090683 | A1 | * | 5/2004 | Nagata ......................... 359/736 |
| 2004/0095503 | A1 | | 5/2004 | Iwasawa et al. ............. 348/344 |
| 2004/0109076 | A1 | * | 6/2004 | Yokota et al. ............... 348/335 |

(Continued)

FOREIGN PATENT DOCUMENTS

JP 2000-515255 T 11/2000

(Continued)

*Primary Examiner*—Hung Dang
*Assistant Examiner*—Vipin M Patel
(74) *Attorney, Agent, or Firm*—Sidley Austin LLP

(57) ABSTRACT

A reflecting prism (PR1) and a reflecting prism (PR2) each adapted to bend an incident ray at a predetermined angle for reflection are arranged in such a manner that an incident surface of the reflecting prism disposed on a side of a subject on an optical path and the exit surface of the other reflecting prism are aligned substantially parallel to each other. The incident surface or the exit surface of at least one of the reflecting prisms has an optical power. At least one lens group including one or more lens element is arranged between the two reflecting prisms in such a manner that the optical axis of the lens group is coincident with the axis of the optical path between the two reflecting prisms. At least one lens group is moved in the direction of the optical axis thereof. Thus, provided are a thin and superfine zoom optical system, an imaging lens device incorporated with the zoom optical system, and a digital apparatus loaded with the imaging lens device.

14 Claims, 20 Drawing Sheets

U.S. PATENT DOCUMENTS

2004/0130647 A1* 7/2004 Kuba .................. 348/335
2006/0017834 A1* 1/2006 Konno et al. ............ 348/335
2007/0024739 A1* 2/2007 Konno .................. 348/337

FOREIGN PATENT DOCUMENTS

| JP | 2004-070235 A | 3/2004 |
| JP | 2004-170707 A | 6/2004 |
| JP | 2004-247887 A | 9/2004 |
| JP | 2004-355010 A | 12/2004 |

* cited by examiner

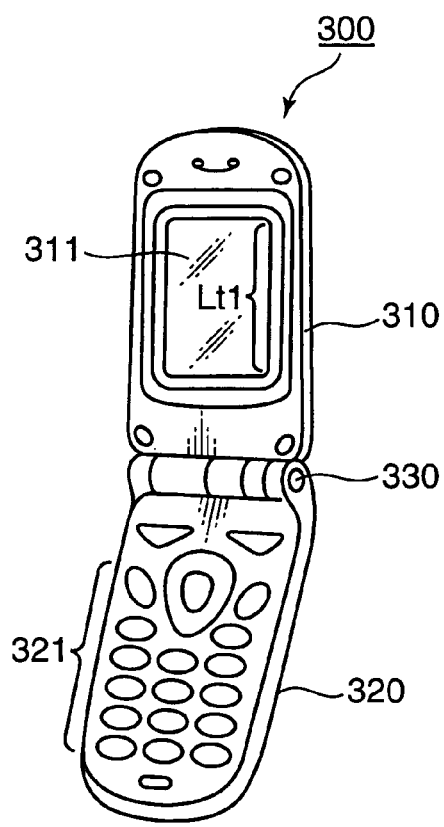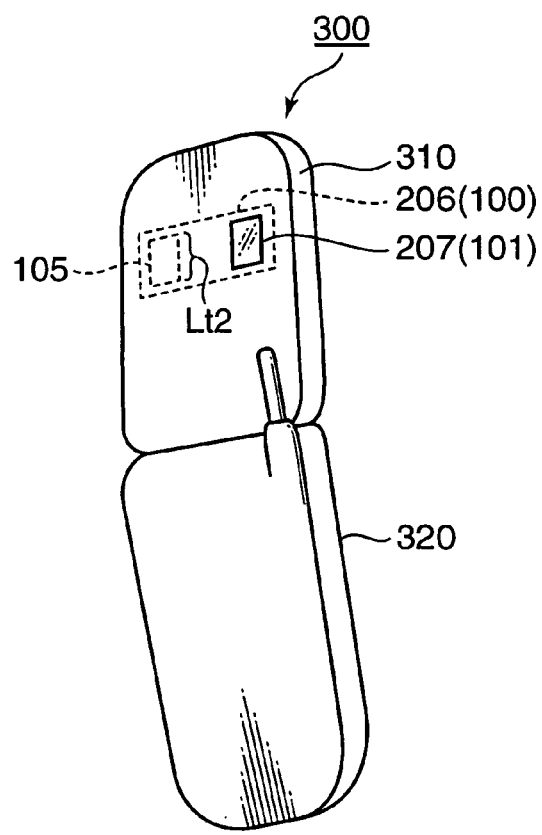
FIG.8A
FIG.8B

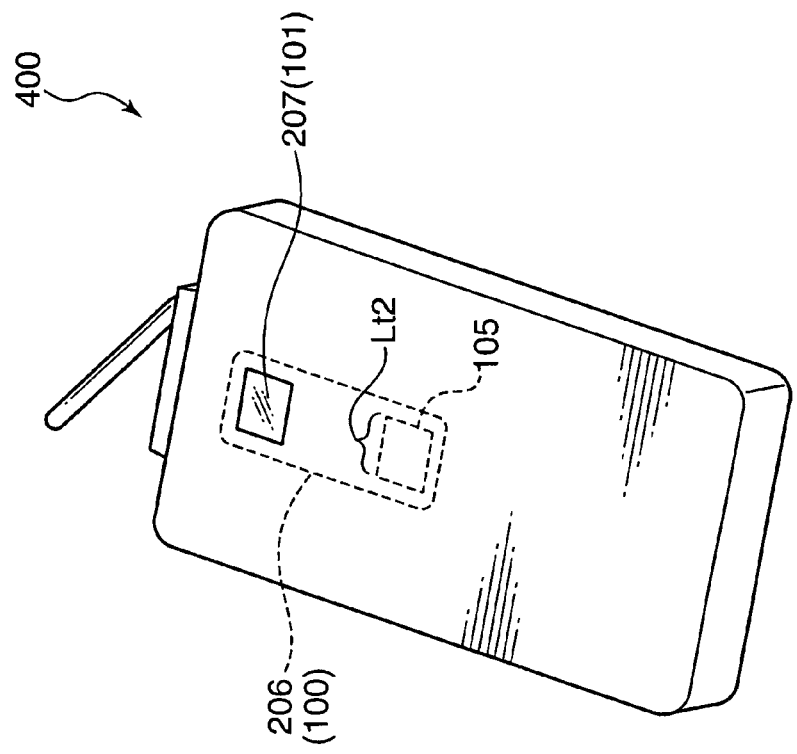
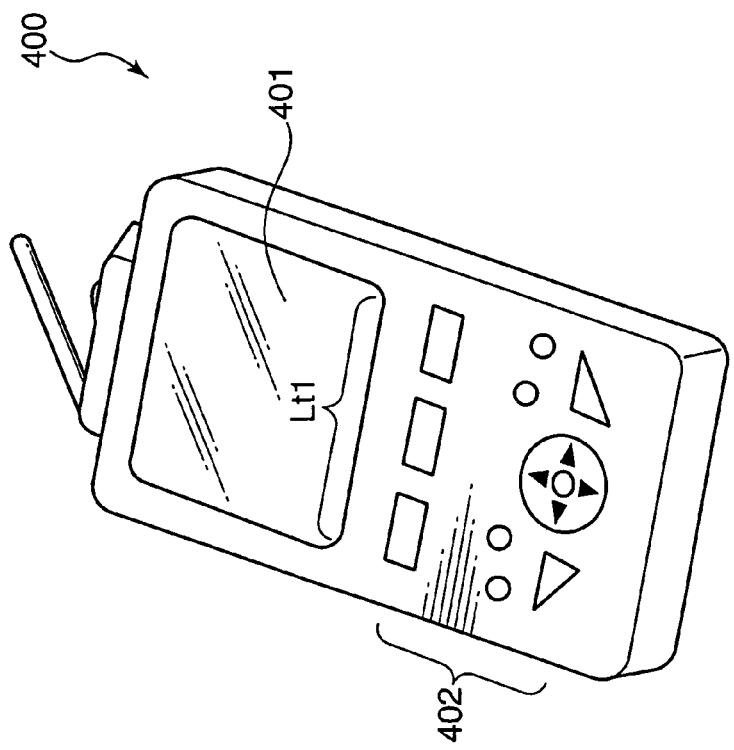

LONGITUDINAL SPHERICAL ABERRATION
(W)

ASTIGMATISM

DISTORTION (M)

(T)

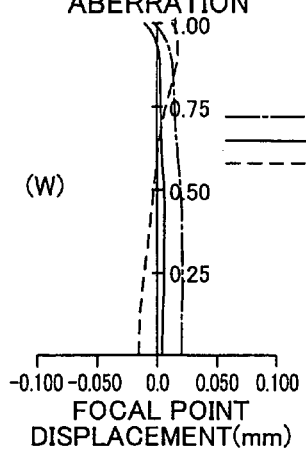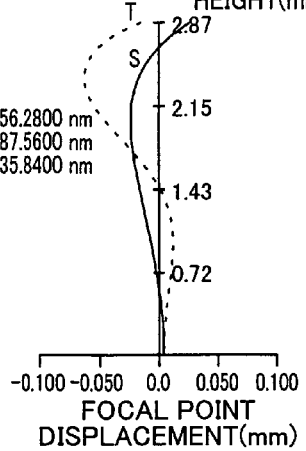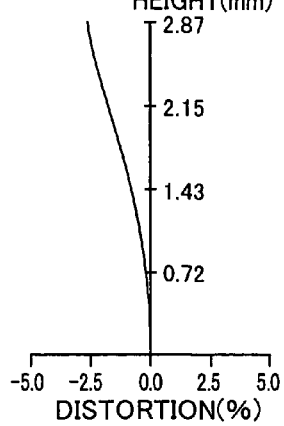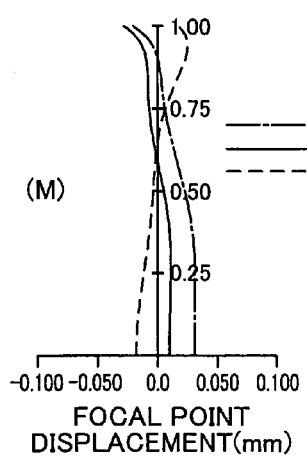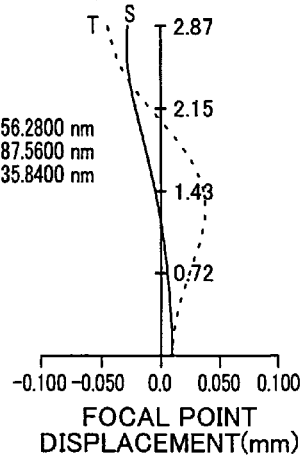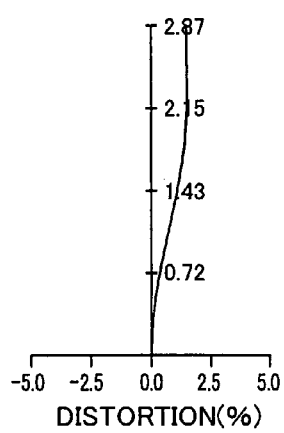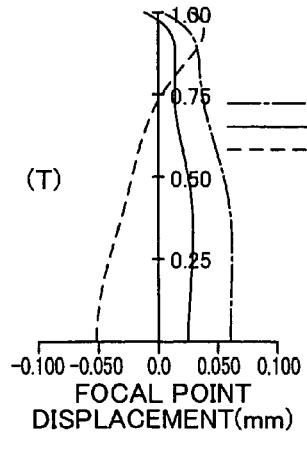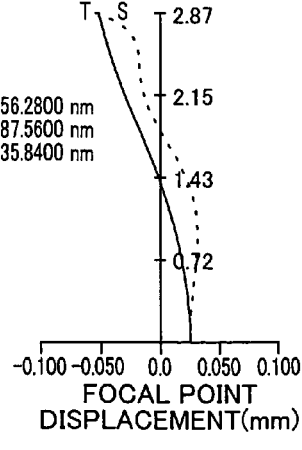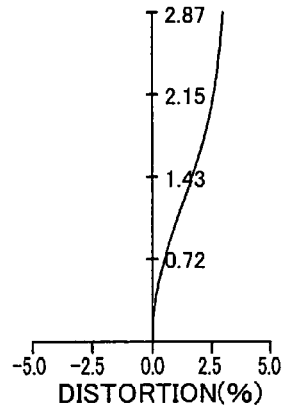

FIG. 19A LONGITUDINAL SPHERICAL ABERRATION
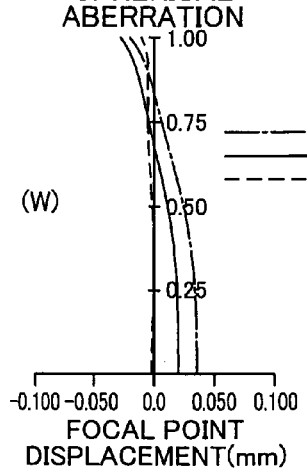
FIG. 19B ASTIGMATISM
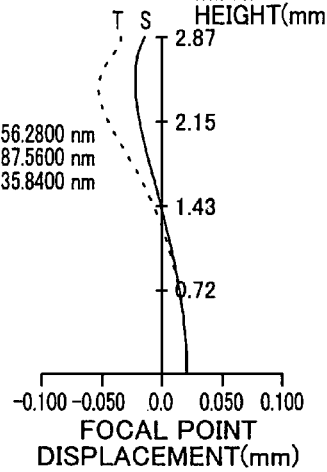
FIG. 19C DISTORTION
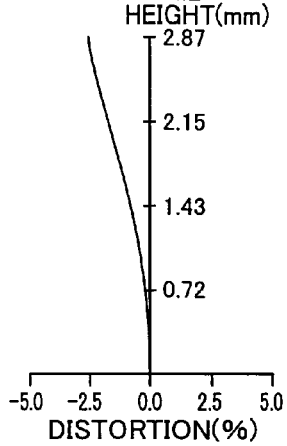
FIG. 19D
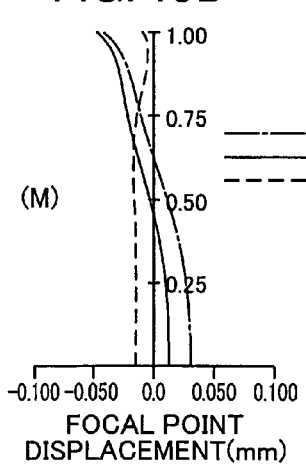
FIG. 19E
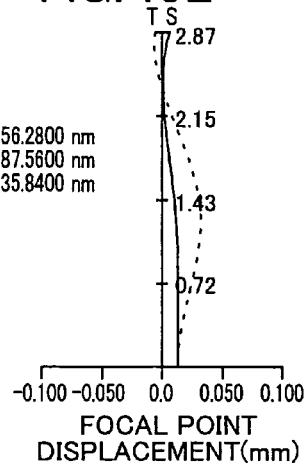
FIG. 19F
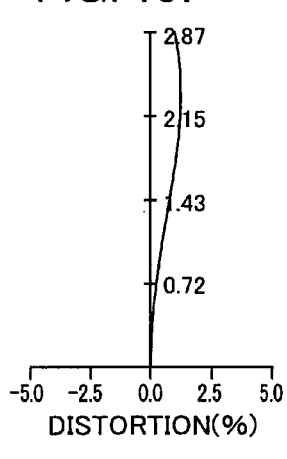
FIG. 19G
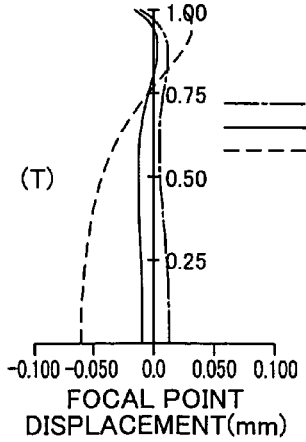
FIG. 19H
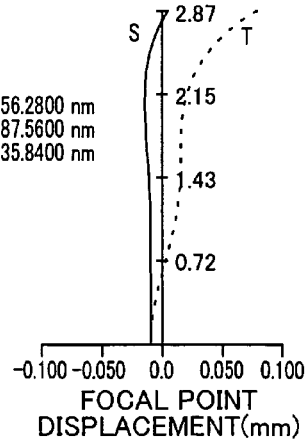
FIG. 19I
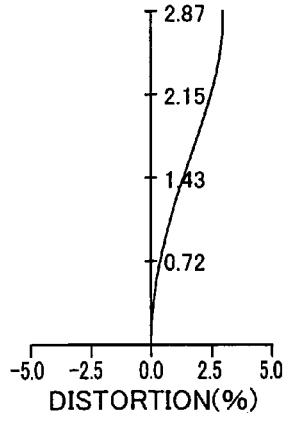

LONGITUDINAL SPHERICAL ABERRATION
(W)

ASTIGMATISM
IMAGE HEIGHT(mm)
656.2800 nm
587.5600 nm
435.8400 nm

DISTORTION
IMAGE HEIGHT(mm)

(M)

656.2800 nm
587.5600 nm
435.8400 nm (T)

656.2800 nm
587.5600 nm
435.8400 nm

ZOOM OPTICAL SYSTEM, IMAGING LENS DEVICE, AND DIGITAL APPARATUS

This application is based on Japanese Patent Application Nos. 2004-315771, and 2005-38391 respectively filed on Oct. 29, 2004, and Feb. 15, 2005, the contents of which are hereby incorporated by reference.

BACKGROUND OF THE INVENTION

1. Field of the Invention

The present invention relates to a thin zoom optical system, an imaging lens device incorporated with the zoom optical system, and a digital apparatus loaded with the imaging lens device.

2. Description of the Related Art

In recent years, with an explosive spread of digital apparatuses such as a digital still camera, a digital video camera, a mobile phone with a built-in camera (hereinafter, called as "camera phone"), and a personal digital assistant (PDA), development of a high-resolution or sophisticated image sensor to be loaded in these digital apparatuses has been rapidly progressed. In view of this, high optical performance is demanded for a zoom optical system for guiding an optical image of a subject to an image sensor in order to sufficiently utilize the performance of the high-resolution image sensor.

Also, in digital apparatuses for general use, there is a demand for optical zooming capable of zooming an image, particularly, with less image degradation. In addition to this demand, miniaturization is required to enhance portability. There is proposed reducing the thickness of the zoom optical system as one measure for miniaturization of the digital apparatus. Conventionally, a collapsible mechanism has been adopted in the zoom optical system as one measure for miniaturization of the zoom optical system, for instance.

In the zoom optical system adopting the collapsible mechanism, the construction of a lens barrel is complicated, which may give rise to cost increase. Further, in a mechanism constructed such that a lens unit pops out in response to turning on of the power of the digital apparatus, it takes a certain time to finalize a shooting preparatory operation. Accordingly, a user may fail to release the shutter at a right moment to capture a scene.

There is known a technique of providing a reflecting surface on an optical path of a zoom optical system, as another measure for reducing the thickness of the zoom optical system. Various arrangements have been proposed in the zoom optical system. For instance, Japanese Unexamined Patent Publication No. 2004-70235 (called as "D1") discloses a zoom optical system, wherein an optical axis is bent by 90 degrees by fixedly arranging a triangular prism in a lens group closest to an object or a subject, and an incident surface of the triangular prism for passing an incident ray is shaped into an aspherical concave surface. Japanese Unexamined Patent Publication No. 2004-170707 or counterpart U.S. Patent Application Publication No. 2004/0095503A1 (called as "D2") discloses a technique of miniaturizing a zoom optical system by providing two reflecting surfaces for bending an optical axis by 90 degrees, wherein the bending direction is "twisted" in the space. Japanese PCT Publication (tokuhyo) 2000-515255 or counterpart U.S. Pat. No. 6,850,279B1 (called as "D3") discloses a technique of miniaturizing an optical system by providing two reflecting elements, namely, mirrors for bending an optical axis by 90 degrees in a fixed focal length optical system. Japanese Unexamined Patent Publication No. 2004-247887 (called as "D4") discloses a technique of miniaturizing an optical system by providing two reflecting elements such as a triangular prism or a mirror for bending an optical axis by 90 degrees.

The zoom optical system recited in D1 uses the triangular prism whose incident surface is an aspherical concave surface in an attempt to realize a thin, compact zoom optical system with its thickness thereof being reduced. In the zoom optical system recited in D1, since the optical axis is bent once, the thickness of the camera incorporated with the zoom optical system is determined by the size of the image sensor. Generally, parts such as a wiring, a circuit, and a packaging unit are arranged in the periphery of a light receiving plane of an image sensor, and the areas of these parts are considerably large as compared with the area of the light receiving plane. Therefore, the arrangement of D1 needs further improvement for miniaturization.

The zoom optical system recited in D2 has two reflecting surfaces for bending the optical axis by 90 degrees. However, the bending direction is "twisted" in the space. Accordingly, as in the case of D1, the thickness of the camera loaded with the optical system is determined by the size of the image sensor, and the arrangement of D2 needs further improvement for miniaturization.

In the optical system recited in D3, the thickness of the camera is determined by the thickness of the optical system, because the two reflecting surfaces are provided to bend the optical axis by 90 degrees, and the object-side surface of the optical system is made parallel with the imaging plane of the image sensor. Since the optical system recited in D3 is a fixed focal length optical system, a zoom optical system is not provided. Further, the optical axis is bent by using a reflecting mirror, the required optical path is long as compared with the case of using a prism. As a result, the thickness of the optical system at a portion where the optical axis is bent is increased.

Although a prism is used for bending the optical axis in the optical system recited in D4, the prism is a triangular prism of a simple construction. Further, since a lens element is provided on the object side outside of the prism, the arrangement of D4 needs further improvement for miniaturization. Furthermore, the lens element is used merely as a photographing window, and D4 does not disclose an idea of effectively utilizing an effect by the provision of the lens element. As mentioned above, the optical systems disclosed in D1 through D4 have failed to provide a high-performance zoom optical system, and there is room for further miniaturization in these optical systems.

SUMMARY OF THE INVENTION

It is an object of the invention to provide a zoom optical system, an imaging lens device, and a digital apparatus which are free from the problems residing in the prior art.

It is another object of the invention to provide a thin, compact zoom optical system with high optical performance and less production cost increase, which is loadable in a mobile phone or a personal digital assistant (PDA), an imaging lens device incorporated with the zoom optical system, and a digital apparatus loaded with the imaging lens device.

According to an aspect of the invention, a zoom optical system comprises two reflecting prisms each of which is adapted to bend an incident ray at a predetermined angle for reflection, and at least one lens group including one or more lens elements arranged between the two reflecting prisms, wherein an incident surface of the reflecting prism disposed on a side of a subject on an optical path, and an exit surface of the other reflecting prism are aligned substantially parallel to each other, the incident surface or the exit surface of at least one of the reflecting prisms has an optical power, an optical axis of the lens group and an axis of the optical path between the reflecting prisms are coincident with each other, and the lens group is movable in a direction of the optical axis thereof for zooming.

These and other objects, features and advantages of the present invention will become more apparent upon reading of the following detailed description along with the accompanying drawings.

BRIEF DESCRIPTION OF THE DRAWINGS

FIGS. 2A and 2B are optical path diagrams each showing a relation between an incident side prism and a light ray, wherein FIG. 2A shows a prism which does not have an optical power, and FIG. 2B shows a prism having an optical power.

FIGS. 4A and 4B are cross-sectional views each showing an imaging side prism provided with an infrared blocking function, wherein FIG. 4A shows an example that an infrared reflecting film is integrally formed on an exit surface of an imaging side prism, and FIG. 4B shows an example that an infrared absorbing film is integrally formed on a reflecting surface of an imaging side prism.

FIGS. 7A and 7B are external schematic views each showing a camera phone loaded with the inventive zoom optical system, wherein FIG. 7A shows an external appearance of an operating face of the camera phone, and FIG. 8B shows an external appearance of a back face of the camera phone.

FIGS. 8A and 8B are external schematic views each showing a foldable camera phone loaded with the inventive zoom optical system, wherein FIG. 8A shows an external appearance of an operating face of the camera phone, and FIG. 8B shows an external appearance of a back face of the camera phone.

FIGS. 9A and 9B are external schematic views each showing a personal digital assistant loaded with the inventive zoom optical system, wherein FIG. 9A shows an external appearance of an operating face of the personal digital assistant, and FIG. 9B shows an external appearance of a back face of the personal digital assistant.

FIGS. 18A through 18I are aberration diagrams regarding spherical aberrations, astigmatisms, and distortion aberrations of lens groups in the zoom optical system in Example 2 with an infinite focal length.

FIGS. 19A through 19I are aberration diagrams regarding spherical aberrations, astigmatisms, and distortion aberrations of lens groups in the zoom optical system in Example 3 with an infinite focal length.

DETAILED DESCRIPTION OF THE PREFERRED EMBODIMENTS OF THE INVENTION

Figure 1:
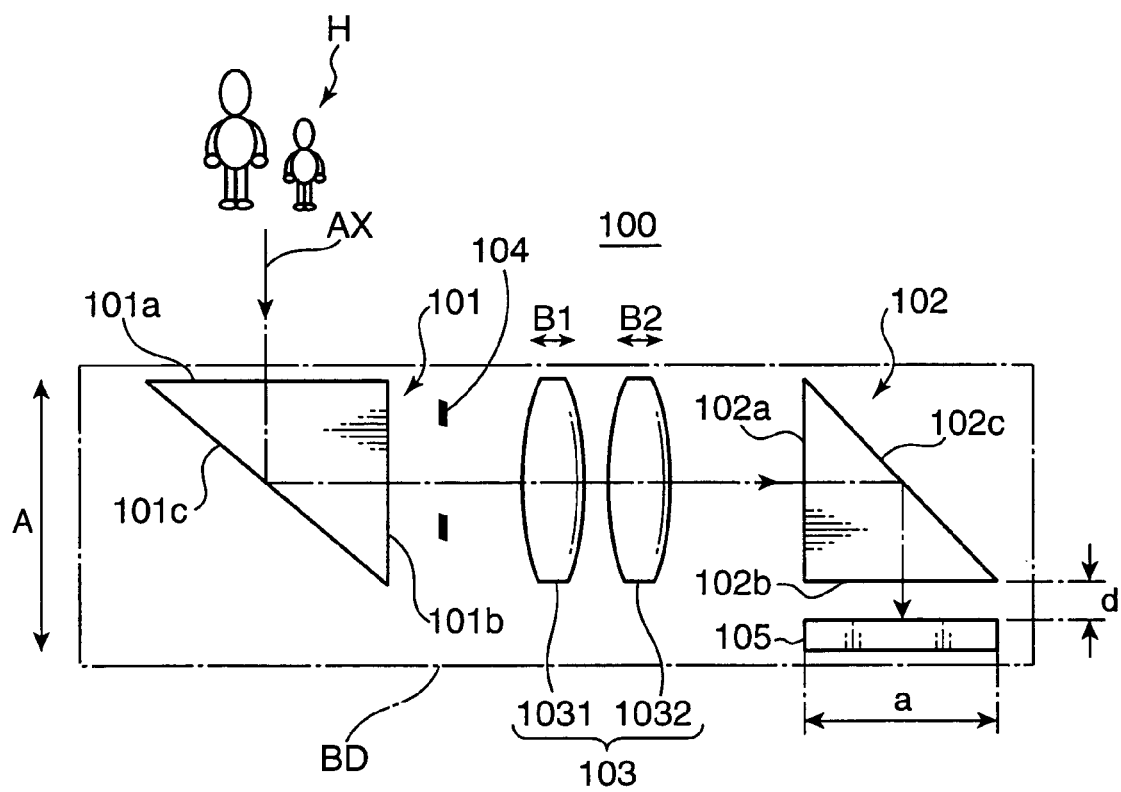
FIG. 1 is an illustration schematically showing an arrangement of a zoom optical system embodying the invention.

In the following, embodiments of the invention are described referring to the drawings.

<Description on Arrangement of Zoom Optical System>

FIG. 1 is an illustration schematically showing an arrangement of a zoom optical system 100 embodying the invention. The zoom optical system 100 is adapted to form an optical image of a subject H on a light receiving plane of an image sensor 105 which converts the optical image into electrical signals. The zoom optical system 100 has two reflecting prisms each adapted to bend an incident ray at a certain degree, e.g., about 90 degrees, for guiding the reflected ray in a predetermined direction. Specifically, the zoom optical system 100 has a first reflecting prism 101 disposed on the side of the subject H on the optical path (hereinafter, also called as "incident side prism 101"), and a second reflecting prism 102 disposed on the side of the image sensor 105 on the optical path (hereinafter, also called as "imaging side prism 102"). A lens group 103 for focusing and zooming, and an aperture stop 104 are arranged between the incident side prism 101 and the imaging side prism 102. The lens group 103 includes a zoom lens elements 1031, 1032 which are movable in the directions of the arrows B1, B2 in FIG. 1, respectively.

An incident surface 101a of the incident side prism 101 and an exit surface 102b of the imaging side prism 102 are disposed substantially parallel to each other. Specifically, an optical axis AX from the subject H to the image sensor 105 is bent on a reflecting surface 101c of the incident side prism 101 at 90 degrees, and then bent on a reflecting surface 102c of the imaging side prism 102 at 90 degrees. The zoom optical system 100 is housed in an apparatus housing BD of a variety of digital apparatuses such as a mobile phone.

In the zoom optical system 100 having the above construction, at least one of the incident surface 101a of the incident side prism 101 and an incident surface 102a of the imaging side prism 102, or at least one of an exit surface 101b of the incident side prism 101 and the exit surface 102b of the imaging side prism 102 has an optical power. For instance, the incident surface 101a or the exit surface 101b of the incident side prism 101, and/or the incident surface 102a or the exit surface 102b of the imaging side prism 102 has an optical power. Alternatively, the incident surface 101a of the incident side prism 101 and the incident surface 102a of the imaging side prism 102, or the exit surface 101b of the imaging side prism 101 and the exit surface 102b of the imaging side prism 102 may have an optical power. In any of the arrangements, at least one of the incident surfaces 101a, 102a, or at least one of the exit surfaces 101b, 102b is utilized as a surface having a function of a lens element. Accordingly, this arrangement enables to obviate use of an additional optical device, which contributes to production of a compact zoom optical system.

The image sensor 105 photoelectrically converts an optical image of the subject H formed by the zoom optical system 100 into image signals of red (R), green (G), and blue (B) components in accordance with the light amount of the optical image for outputting the image signals to a specified image processing circuit. An example of the image sensor 105 is a single CCD color area sensor of a so-called "Bayer matrix" in which patches of color filters each in red (R), green (G), and blue (B) are attached on respective surfaces of charge coupled devices (CCDs) arrayed in two dimensions. A CMOS image sensor, a VMIS image sensor, and a like sensor are usable as the image sensor in addition to the CCD color area sensor.

Figure 2A:
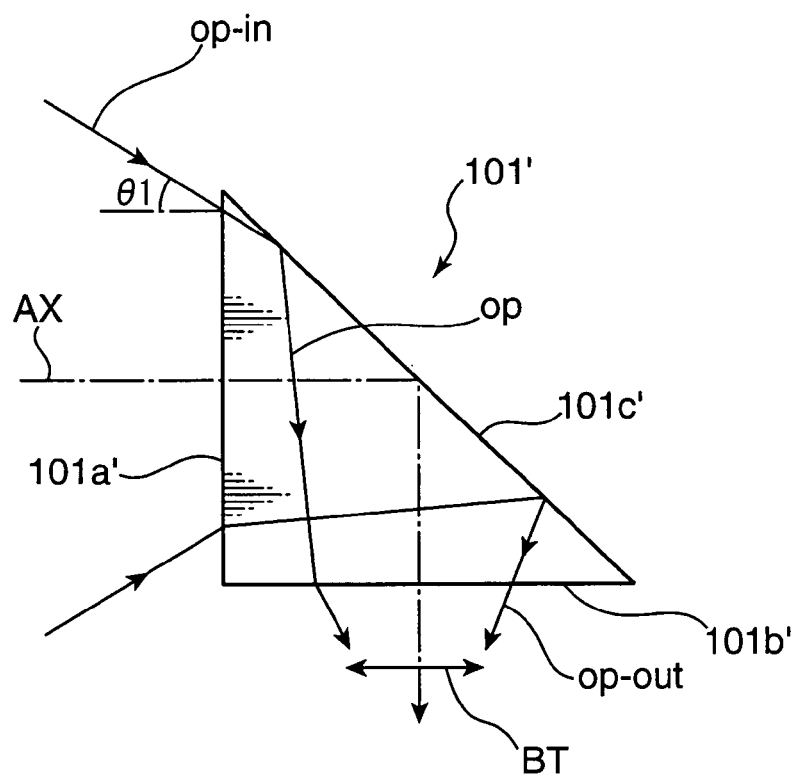
Figure 2B:
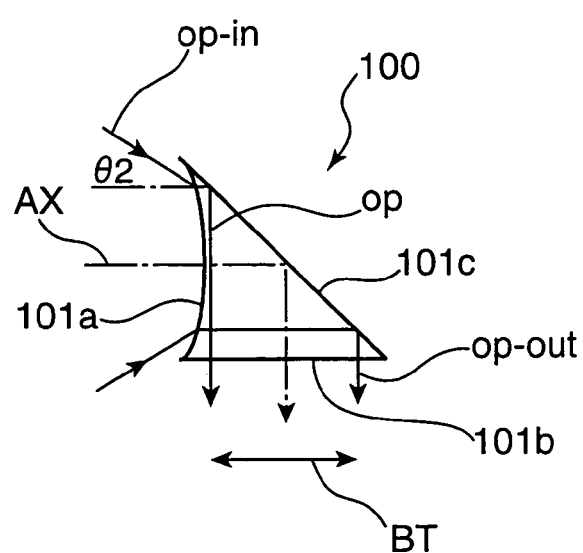

The following advantages are obtained in the arrangement that the aperture stop 104 is disposed on the side of the exit surface 101b of the incident side prism 101, and that the incident surface 101a of the incident side prism 101 has a negative optical power. FIGS. 2A and 2B are optical path diagrams each showing a relation between an incident side prism 101' and a light ray. In the case where light rays having a certain width BT are allowed to go out of the incident side prism, it is preferable that an exit ray op-out propagating in an outermost peripheral region of the prism goes out from the prism substantially in parallel with the optical axis AX to miniaturize the prism itself.

Specifically, as shown in FIG. 2A, in the case where an incident surface 101a' of the incident side prism 101' is flat, it is impossible to minimize an incident angle θ1 of an incident ray op-in which is incident onto the incident surface 101a' and propagates in an outermost peripheral region of the prism 101' relative to the optical axis AX. As a result, the exit ray op-out goes out of the prism 101' with a certain inclination relative to the optical axis AX. In such an arrangement, it is required to increase the areas of the incident surface 101a' and an exit surface 101b', considering the inclination, to secure a certain light width BT, which may cause size increase of the prism.

On the other hand, as shown in FIG. 2B, in the case where an incident surface 101a of an incident side prism 101 is concaved and has a negative optical power, an incident angle θ2 of an incident ray op-in which is incident onto the incident surface 101a and propagates in an outermost peripheral region of the incident side prism 101 is small relative to the optical axis AX. As a result, an exit ray op-out goes out of the prism 101 substantially parallel to the optical axis AX. This arrangement enables to remarkably reduce the size of the prism for securing a certain light width BT and contributes to miniaturization of the zoom optical system 100, as compared with the arrangement as shown in FIG. 2A.

It is possible to construct a zoom optical system equipped with a reflecting mirror, in place of using the incident side prism 101 and the imaging side prism 102 as mentioned above. In such a case, however, a member for supporting the reflecting mirror is additionally required, which may increase the production cost or increase the size of the zoom optical system. Therefore, it is desirable to adopt the zoom optical system with the two reflecting prisms as mentioned above.

It is possible to bend the incident ray on the reflecting surface at degrees other than 90 degrees. However, it is most preferred to set the bending angle at 90 degrees to attain miniaturization of the zoom optical system 100 in light of the fact that the size of the zoom optical system is increased in the direction of the arrows A in FIG. 1, as the bending angle is away from 90 degrees.

In the case where the image sensor 105 is of a rectangular shape having a longer side and a shorter side, it is preferable that a light ray is bent in the shorter side direction of the image sensor 105, namely, in the direction of the arrows a in FIG. 1. It is possible to reduce the thickness of the zoom optical system 100 to some extent by bending a light ray in the longer side direction of the image sensor 105. However, designing the optical system in such a manner as to bend a light ray in the shorter side direction of the image sensor 105 is advantageous in producing a thin zoom optical system.

Further, as shown in the zoom optical system 100 in FIG. 1, it is preferable to arrange an optical device having a refractive power or an optical power on the optical path between the incident surface 101a of the incident side prism 101 and the exit surface 102b of the imaging side prism 102 without arranging an optical device having a refractive power or an optical power on the optical path on the side of the subject H (hereinafter, also called as "subject side" or "object side") with respect to the incident surface 101a of the incident side prism 101 or on the optical path on the side of the image sensor 105 (hereinafter, also called as "imaging side") with respect to the exit surface 102b of the imaging side prism 102. As compared with the arrangement that an optical device having a refractive power is arranged on the optical path on the side of the subject H with respect to the incident surface 101a of the incident side prism 101, this arrangement enables to reduce the thickness of the zoom optical system 100 in the direction of the arrows A, which contributes to miniaturization of the zoom optical system 100.

Further, in the zoom optical system 100, it is preferable to arrange a lens group including at least one lens element between the incident side prism 101 and the imaging side prism 102 to correct spherical aberration, field curvature, or a like drawback and to improve optical performance of the zoom optical system 100. In arranging the lens element or the like, a drawback of unduly increasing the size of the optical system in the direction of the arrows A resulting from loading of the lens element can be avoided by adopting a lens element having a size smaller than the reflecting prism in the direction of the arrows A.

Alternatively, it is possible to shape the lens element into a D-shape or an elliptical or oval shape in sectional view taken along the optical axis AX, for instance, by removing an unused portion such as a peripheral portion of the lens element to keep the size of the optical system from unduly increasing in the direction of the arrows A.

It is preferable to drive the lens group including at least one lens element in an optical axis direction thereof, namely, in a direction substantially parallel with the incident surface 101a of the incident side prism 101 for zooming for the following reasons. If a zoom optical system is configured in such a manner that the entirety of the zoom optical system including a reflecting prism is driven in the optical axis direction, such an arrangement may obstruct miniaturization of the optical system due to change of the thickness of the entirety of the optical system, or may give rise to drawbacks such as size increase of a drive motor due to increase of the weight of a device to be driven, misalignment of the optical axis by the motor driving, and complexity of a mechanism for supporting the optical devices of the zoom optical system. Arranging a lens group between the two reflecting prisms and driving the lens group in the optical axis direction enables to fix the reflecting prisms and the aperture stop, and to eliminate various drawbacks such as size increase of the drive motor, occurrence of misalignment of the optical axis, and complexity of the optical device supporting mechanism.

Generally, in zooming, two lens groups, namely, a variator lens group and a compensator lens group are required to be moved. In view of this, preferably, at least two lens groups are arranged between the two prisms, with each of the lens groups being movable in the optical axis direction for an intended zooming operation. Moving the two lens groups individually along the optical axis direction enables to produce a thin and compact zoom optical system loadable in a mobile phone or a PDA, because this arrangement is free from a change of the thickness of the optical system in zooming. Further, moving both of the two lens groups enables to shorten the moving distance of the respective lens groups, as compared with an arrangement of moving a single lens group, which leads to miniaturization of the optical system. Alternatively, it is possible to move a single lens group in zooming by properly regulating a zoom resolution as in the case of an optical zoom system.

In the zoom optical system 100 shown in FIG. 1, the zoom lens elements 1031, 1032 are arranged between the incident side prism 101 and the imaging side prism 102 to satisfy the above requirements. In other words, zooming is performed by driving the zoom lens elements 1031, 1032 in a direction parallel to the incident surface 101a of the incident side prism 101, namely, in the directions of the arrow B1, B2 in FIG. 1, respectively.

Similarly, it is desirable to drive the lens group 103 including at least one lens element i.e. the zoom lens elements 1031, 1032 in the optical axis direction of the lens group 103, namely, in this embodiment, parallel with the axis of the optical path between the incident side prism 101 and the imaging side prism 102 for focusing for the same reasons as mentioned above in driving the lens group 103 for zooming.

In the zoom optical system 100, it is preferable to make the optical surfaces of the respective optical devices of the zoom optical system 100 symmetrical to each other with respect to the optical axis AX, namely, rotationally symmetrical to each other in light of feasibility of production of the optical devices such as the incident side prism 101, the imaging side prism 102, and the zoom lens elements 1031, 1032. An axially asymmetrical optical system is not desirable because production of such an optical system is difficult, and production cost may increase, considering assembling evaluation and difficulty in positional adjustment. However, it is possible to use axially asymmetrical surfaces as reflecting surfaces, as far as cost increase is permissible.

A preferred arrangement relation between the exit surface 102b of the imaging side prism 102 and the image sensor 105 is described. Specifically, as shown in FIG. 1, the size of the zoom optical system 100 in the direction of the arrows A can be reduced by constructing the optical system as mentioned above. However, in the arrangement that the image sensor 105 is housed in the apparatus housing BD with the exit surface 102b of the imaging side prism 102 opposing to the image sensor 105, it is desirable to minimize the distance between the exit surface 102b of the imaging side prism 102 and the image sensor 105 to reduce the thickness of the apparatus housing BD.

Now, let us assume that d represents a distance between the exit surface 102b of the imaging side prism 102 and the light receiving plane of the image sensor 105, the distance d including a physical distance in a case that an optical component is arranged between the imaging side prism 102 and the image sensor 105, and a represents a height of the light receiving plane of the image sensor 105 on a plane where the optical path of the zoom optical system 100 is folded, which corresponds to the plane of FIG. 1, e.g., the size of the image sensor 105 in the shorter side direction thereof. Then, in the embodiment of the invention, an arrangement relation between the exit surface 102b of the imaging side prism 102 and the image sensor 105 as defined by the conditional formula (1) is established. This arrangement enables to minimize the apparatus housing BD in the thickness direction thereof.

$$0.0 \leq d/a < 0.8 \tag{1}$$

In the above formula (1), if d/a is 0.8 or larger, the distance d between the exit surface 102b of the imaging side prism 102 and the light receiving plane of the image sensor 105 becomes too large, which obstructs reducing the thickness of the apparatus housing BD. In other words, a large distance d means a large imaging side prism for forming an optical image on the light receiving plane of the image sensor 105. As a result, the thickness of the zoom optical system 100 is increased as a whole.

On the other hand, the arrangement of d/a=0, namely, the arrangement of contacting the exit surface 102b of the imaging side prism 102 with the light receiving plane of the image sensor 105 may be a preferred arrangement in minimizing the size of the zoom optical system 100 in the direction of the arrows A. However, contact of the exit surface 102b with the light receiving plane of the image sensor 105 may give rise to difficulty in assembling. In addition to this drawback, there is likelihood that a ghost image may appear by plane reflection between the exit surface 102b and the light receiving plane of the image sensor 105. In order to avoid these drawbacks, it is desirable to set the lower limit of d/a at 0.1 or larger.

Figure 3:
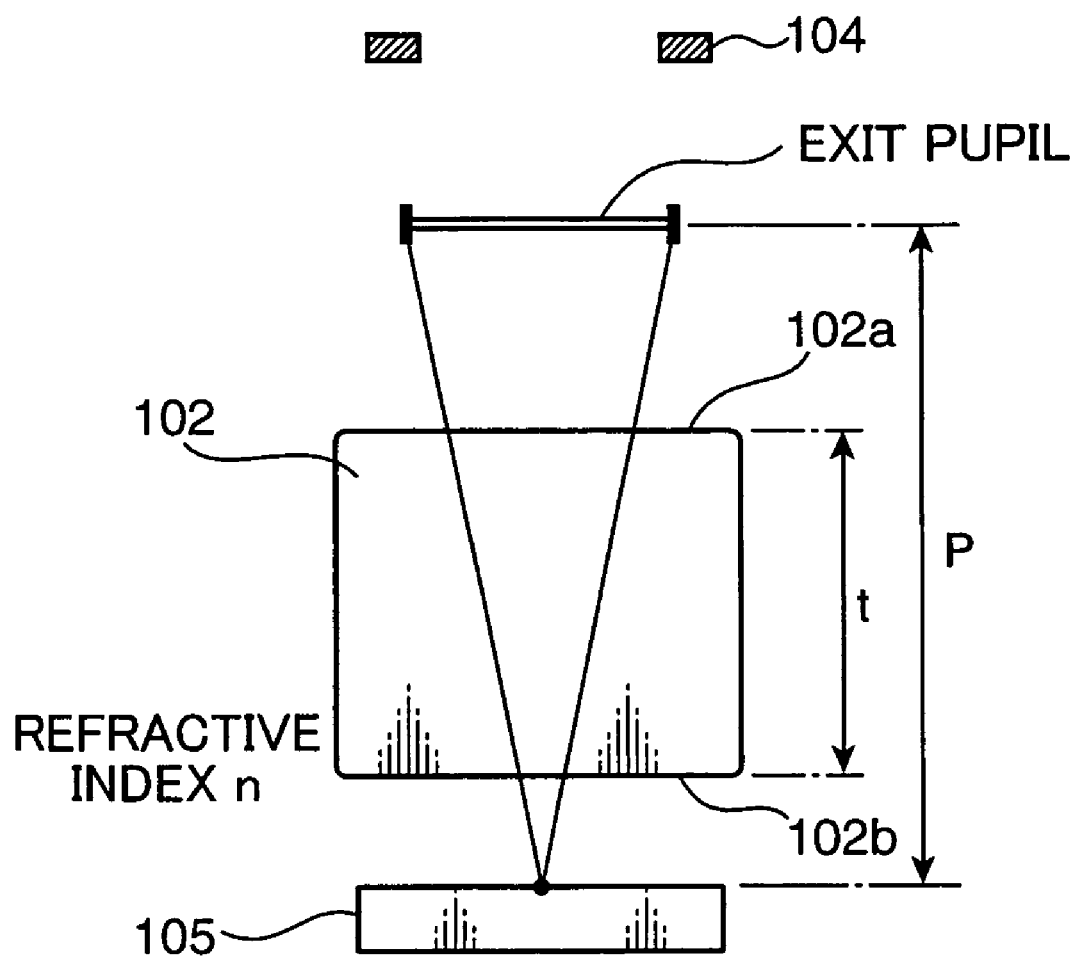
FIG. 3 is an illustration for explaining an exit pupil distance.

As mentioned above, the thickness of the zoom optical system 100 can be reduced not only by setting the arrangement relation between the exit surface 102b of the imaging side prism 102 and the image sensor 105 as defined above, but also by optimizing the size or the length of the imaging side prism 102. As shown in FIG. 3, it is desirable to satisfy the conditional formula (2) where n represents a refractive index of the imaging side prism 102, t represents a distance of a principal ray on the optical axis AX propagating through the imaging side prism 102, namely, a thickness of the imaging side prism 102 in an expanded state thereof, and p represents an exit pupil distance.

$$-1.5 < (t \cdot n)/p < 1.0 \tag{2}$$

In the formula (2), if (t·n)/p is 1.0 or more, since the exit pupil distance p becomes long relative to the size of the imaging side prism 102, the optical system is closer to a telecentric optical system. As a result, the width of light rays propagating in the imaging side prism 102 is increased, and the size or the length of the imaging side prism is unduly increased in order to allow the light rays of such a large width to repetitively propagate through the imaging side prism. Consequently, such an arrangement leads to failure of miniaturization of the zoom optical system 100.

On the other hand, if (t·n)/p is −1.5 or less, the exit pupil distance p becomes short relative to the size of the imaging side prism 102. As a result, the optical system is likely to pass a light ray of a large inclination with respect to the optical axis, contrary to a telecentric optical system. Generally, a micro lens element is arranged per pixel on the light receiving plane of the image sensor 105 to raise light focusing efficiency. In the case of a telecentric optical system, a micro lens element can be arranged substantially right above each pixel, which is a relatively easy operation. However, if the exit pupil distance p is short, and a light ray propagates with a large inclination with respect to the optical axis, it is necessary to arrange a micro lens element at a displaced position relative to each pixel, considering the inclination. If a light ray propagates with a large inclination due to a value of (t·n)/p smaller than the lower limit of the formula (2), it is difficult to arrange micro lens elements at intended positions to secure a required light amount for focusing. In such an arrangement, light focusing efficiency may be lowered, and the light amount around the micro lens elements may be reduced.

Further, a short exit pupil distance p means a short distance between the aperture stop 104 and the light receiving plane of the image sensor 105. In view of a fact that it is impossible to arrange the aperture stop 104 on the imaging side relative to an incident surface 102a of the imaging side prism 102, namely, it is impossible to provide an aperture stop inside a prism, it is difficult to dispose the aperture stop 104 at an appropriate position if the value of (t·n)/p is smaller than the lower limit of the formula (2).

There is a case that if a CCD image sensor or a CMOS image sensor is used as the image sensor 105, an infrared component may cause a noise, which may degrade an output image. In view of this, a measure of arranging an infrared cut filter or a like element at an appropriate position of a zoom optical system has been conducted to keep an infrared component from being incident onto the image sensor 105. However, such a measure requires an optical component having an infrared blocking function as an additional part, which may hinder miniaturization of the zoom optical system, and reduction of the number of parts.

Figure 4A:
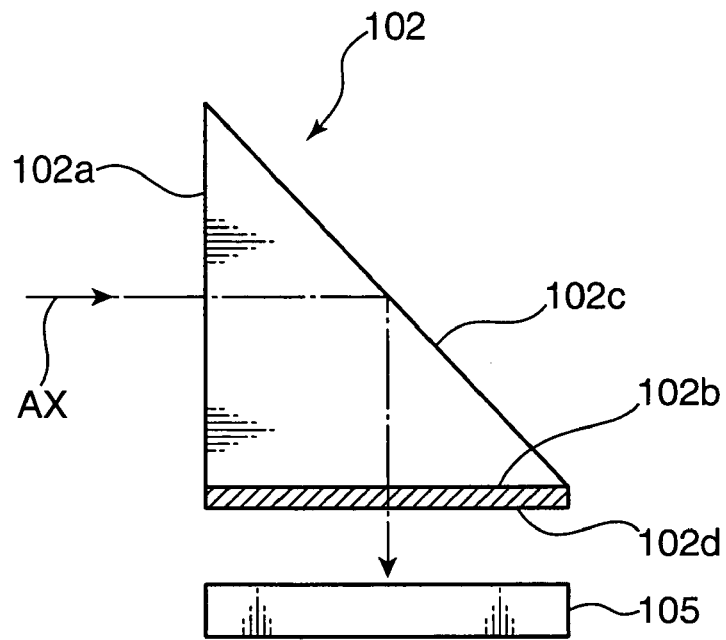
Figure 4B:
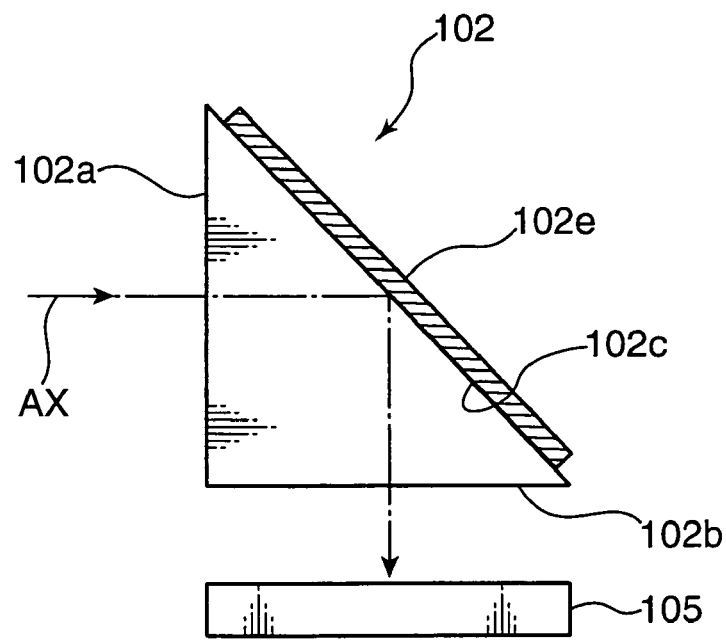

In view of the above, it is desirable to provide the imaging side prism 102 itself with an infrared blocking function of reducing or removing an infrared component included in an incident ray. FIGS. 4A and 4B are cross-sectional views each showing an example of an imaging side prism 102 equipped with an infrared blocking function. FIG. 4A shows an example that an infrared reflecting film 102d is integrally formed on an exit surface 102b of an imaging side prism 102. In this arrangement, an infrared component included in an incident ray is reflected by the infrared reflecting film 102d to thereby keep the infrared component from being incident onto an image sensor 105. A preferred example of the infrared reflecting film 102d is an inductive multilayer coating which reflects light in the range of an infrared wavelength. It is possible to attach the infrared reflecting film 102d on the incident surface 102a of the imaging side prism 102.

FIG. 4B shows an example that an infrared absorbing film 102e is integrally formed on a reflecting surface 102c of an imaging side prism 102. In this arrangement, an infrared component included in an incident ray is absorbed by the infrared absorbing film 102e to thereby keep the infrared component from being incident onto an image sensor 105. A preferred example of the infrared absorbing film 102e is an inductive multilayer coating which absorbs light in the range of an infrared wavelength. It is possible to attach an infrared transparent film on the reflecting surface 102c to pass merely an infrared component through the imaging side prism 102.

Next, materials and production methods of the incident side prism 101 and the imaging side prism 102 are described. There is no specific limit to the material for the prisms 101 and 102. An optical material having a certain light transparency or a certain refractive index such as various kinds of glass materials, and resins (plastic) materials is usable. Use of a resin material is advantageous, as compared with a case of using a glass material, in the aspect of production cost and production of a lightweight zoom optical system, because use of the resin material enables to realize mass-production of lightweight prisms by injection molding or a like technique. Further, in the case of producing a reflecting prism with an incident surface and/or an exit surface having a refractive power, as mentioned above, a grinding process is necessary, if the reflecting prism is made of a glass material. Compared with use of a glass material, use of a resin material is advantageous because a reflecting prism can be easily produced with use of a mold form or a like device.

Production of optical components having high precision may be difficult according to injection molding, because heat shrinkage of some extent is unavoidable after the molding. The imaging side prism 102 requires less precision as compared with the incident side prism 101, because the imaging side prism 102 is disposed closer to the image sensor 105, and error sensitivity thereof is relatively small. In view of this, it is desirable to make at least the imaging side prism 102 of a resin material, and to make the incident side prism 101 of a resin material or a glass material depending on a required precision.

In the case of making the incident side prism 101 and/or the imaging side prism 102 of a resin material, it is possible to use various optical resin materials such as polycarbonate and polymethyl methacrylate (PMMA) as the resin material. Among these, it is desirable to use a resin material having a water absorption coefficient of 0.01% or smaller. A resin material has a moisture absorption power of bonding with water components in the air. If such a moisture absorption power is acted, optical characteristics such as a refractive index may be changed even if the prism is fabricated as designed. In view of this, the zoom optical system 100 free of moisture absorption power can be produced by using a resin material having a water absorption coefficient of 0.01% or less. An example of the resin material having a water absorption coefficient of 0.01% or less is available under the trade name of ZEONEX® produced by Zeon Corporation.

Examples of the method for producing a prism with an incident surface and/or an exit surface having an optical power include cementing a lens element having an optical power with a predetermined prism, grinding a prism to make a curved surface, an injection molding technique, and a glass molding technique. In the technique of cementing a lens element with a prism or in the technique of grinding a prism into a curved surface, axial alignment is required to adjust a positional relation of the reflecting surface of the prism to the lens element to be cemented or to the curved surface of the prism, or an inclination of the prism and the lens element relative to the optical axis, which may make the production process complicated. As compared with the above, an injection molding technique with use of a resin material is preferred because of its superior mass-productivity.

It is desirable to consider the following points in adopting a prism produced by the injection molding. In conducting the injection molding, a gate is necessary for injecting a resin material into a mold. The gate may oppose to any surface of a prism to be molded. However, preferably, the gate may be arranged at a surface of the prism other than a surface used for light incidence, emergence, and reflection. This arrangement is preferred because generally, birefringence is likely to occur on or around the site of the prism where the gate is arranged because trace of resin flow is likely to be formed on the gate arranged site of the prism, which may give adverse effects to optical characteristics of the resultant prism. Arranging the gate at a surface of the prism other than the surface used for light incidence, emergence, and reflection enables to reduce an influence of birefringence, even if birefringence occurs.

Figure 5:
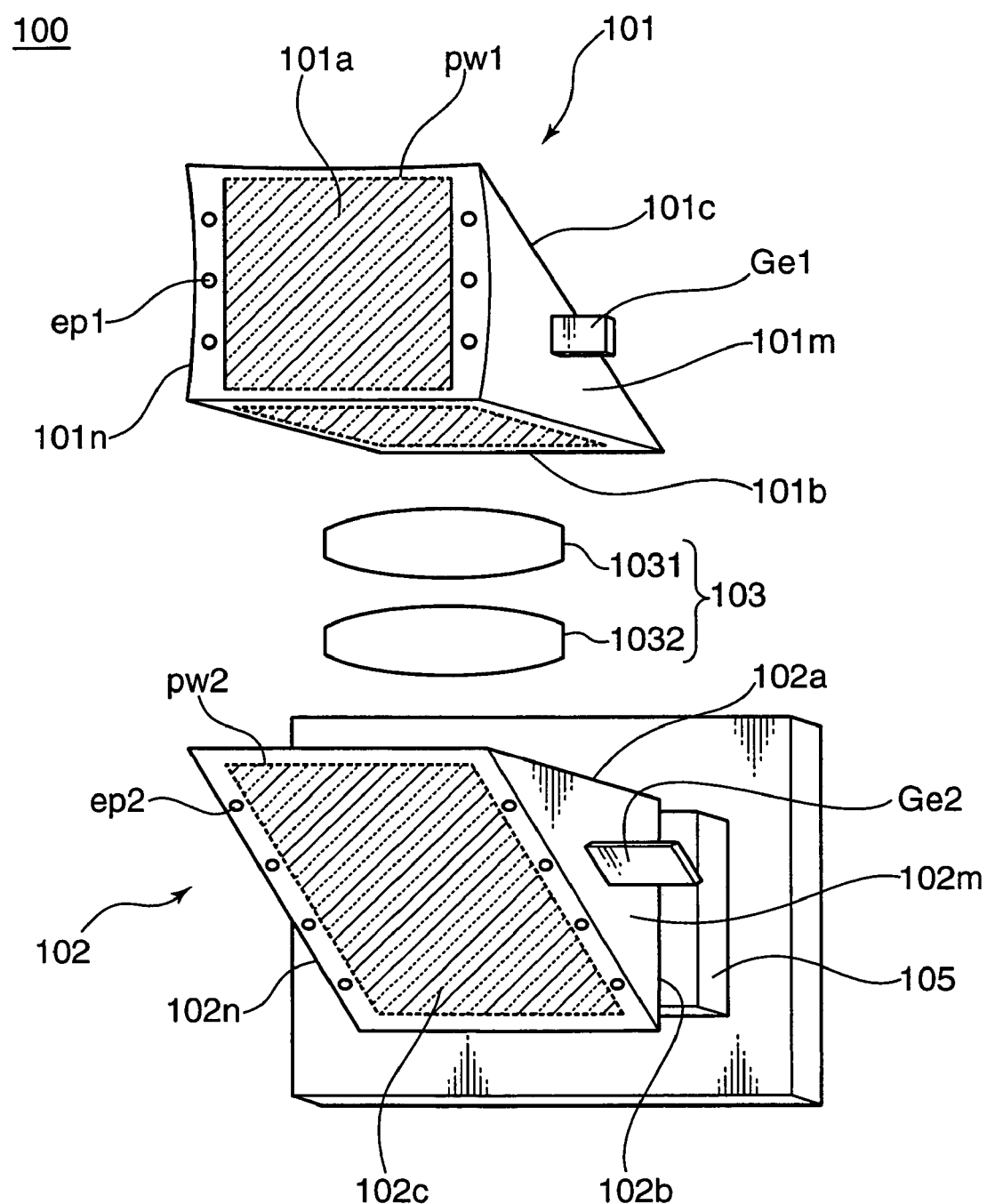
FIG. 5 is a perspective view depicting the zoom optical system shown in FIG. 1 in a stereoscopic manner.

FIG. 5 is a perspective view of the zoom optical system 100 shown in FIG. 1 depicted in a stereoscopic manner. A preferred arrangement of the zoom optical system 100 provided with a prism produced by the injection molding is described referring to FIG. 5. Referring to FIG. 5, in forming the incident side prism 101 by the injection molding, a gate for injecting a resin material into a mold is arranged at an unused surface 101m, which is a surface of the prism other than the incident surface 101a, the exit surface 101b, and the reflecting surface 101c. Generally, since a gate has a prismatic configuration of a rectangular shape in cross section, a gate trace Ge1 of a prismatic configuration having a surface of a broad width parallel with the incident surface 101a is formed on the unused surface 101m. It should be noted that the gate trace Ge1 is illustrated with a larger magnification than the other parts. Arranging the gate in the above-mentioned manner enables to reduce an influence of birefringence which may affect an effective usable area pw1 of the incident side prism 101 shown by the hatched portions in FIG. 5 where light rays are allowed to propagate, even if birefringence occurs in the vicinity of the gate trace Ge1.

Similarly to the incident side prism 101, the imaging side prism 102 is produced by arranging a gate for injecting a resin material into a mold at an unused surface 102m, which is a surface of the prism other than the incident surface 102a, the exit surface 102b, and the reflecting surface 102c. In this case, a gate trace Ge2 of a prismatic configuration having a surface of a broad width parallel with the reflecting surface 102c is formed on the unused surface 102m. Arranging the gate in the above-mentioned manner enables to reduce an influence of birefringence which may affect an effective usable area pw2 of the imaging side prism 102 shown by the hatched portion in FIG. 5, even if birefringence occurs in the vicinity of the gate trace Ge2.

It is a common practice to pressingly take out a molded product, in this case, a prism from the mold with use of eject pins after the injection molding. In this case, traces of the eject pins are also likely to be formed in a site of the prism where the eject pins have been contacted, and optical characteristics may be varied on or around the trace forming site. In the example shown in FIG. 5, eject pins are arranged at a site corresponding to an unused area of the incident surface 101a of the incident side prism 101, so that traces ep1 of the eject pins appear on the unused area. Likewise, eject pins are arranged at a site corresponding to an unused area of the reflecting surface 102c of the imaging side prism 102, so that traces ep2 of the eject pins appear on the unused area. Alternatively, it is possible to arrange eject pins in such a manner that traces ep1 of the eject pins for the incident side prism 101 appear on an unused surface 101n opposite to the unused surface 101m, and traces ep2 of the eject pins for the imaging side prism 102 appear on an unused surface 102n opposite to the unused surface 102m.

In the case where the aperture stop 104 is arranged between the incident side prism 101 and the imaging side prism 102 as shown in the zoom optical system 100 of FIG. 1, it is desirable to arrange the gates at such a position that the gate trace Ge1 on the incident side prism 101 and the gate trace Ge2 on the imaging side prism 102 extend in the same direction, as shown in FIG. 5, in assembling the prisms 101, 102 in the apparatus housing BD. This is described referring to FIG. 6.

Figure 6:
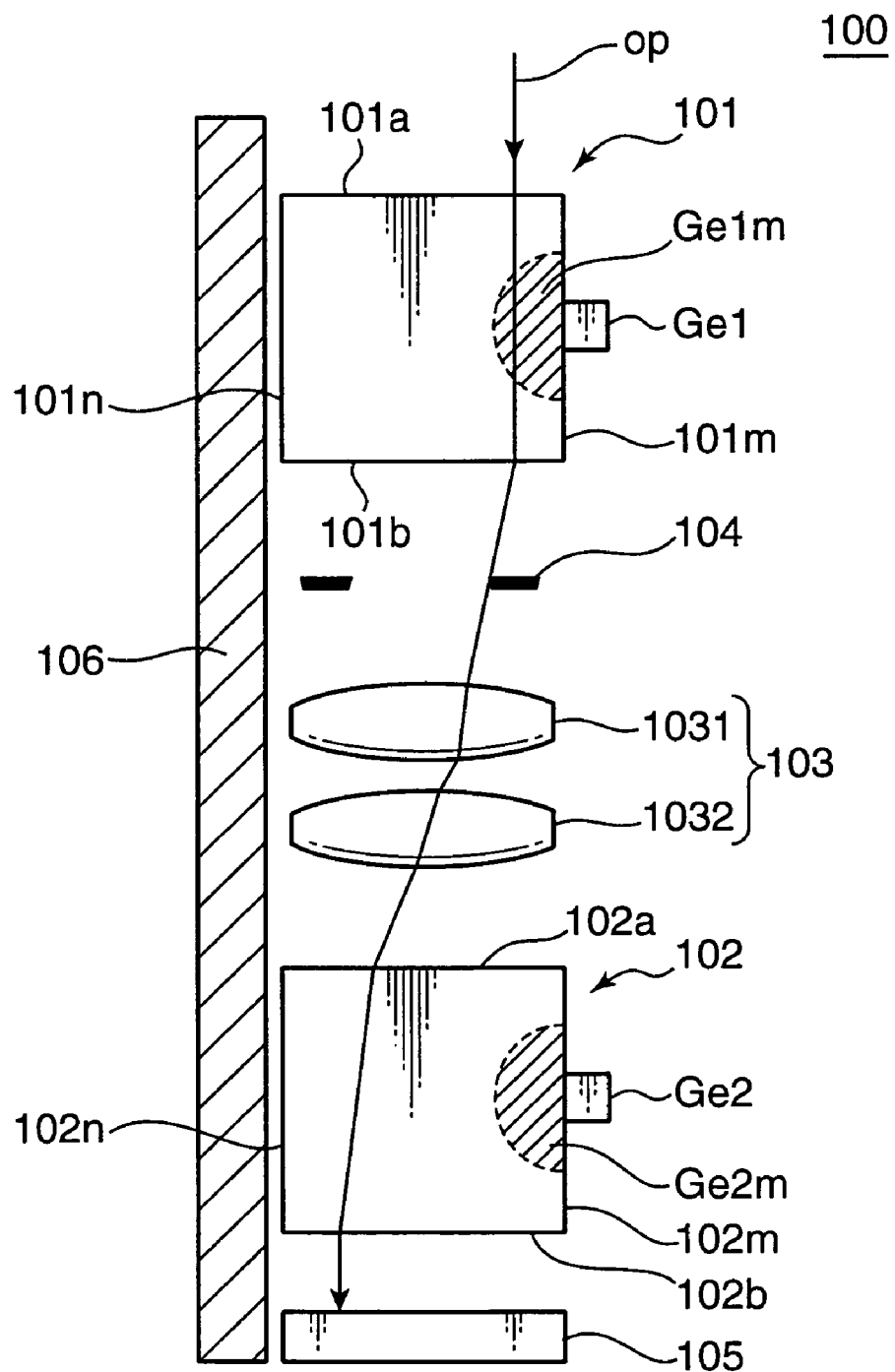
FIG. 6 is a schematic optical path diagram of the zoom optical system shown in FIG. 5.

FIG. 6 is a schematic optical path diagram of the zoom optical system 100 shown in FIG. 5. As illustrated in FIG. 6, the gate trace Ge1 on the incident side prism 101 and the gate trace Ge2 on the imaging side prism 102 are respectively formed on the unused surfaces 101m and 102m aligned in the same direction. The unused surfaces 101n, 102n opposite to the unused surfaces 101m, 102m are flat without formation of the gate traces Ge1, Ge2, namely, stable surfaces in configuration. Therefore, the unused surfaces 101n, 102n are fixedly supported on a prism supporting member 106 commonly provided for the incident side prism 101 and the imaging side prism 102. The prism supporting member 106 corresponds to a frame member of the apparatus housing BD or a like element. With this arrangement, the prisms 101, 102 can be assembled in the apparatus housing BD with high precision.

An influence of birefringence or a like phenomenon can be reduced to some extent, but cannot be completely removed by forming the gate traces Ge1, Ge2 on the unused surfaces 10m, 102m, respectively. Ge1m, Ge2m shown by the hatched portions in FIG. 6 are gate affecting areas, which may affect optical characteristics of the incident side prism 101 and the imaging side prism 102 in the vicinity of the gate traces Ge1, Ge2, respectively.

In the case where the aperture stop 104 is arranged between the incident side prism 101 and the imaging side prism 102, optical images turn upside down before and after passing the aperture stop 104. Considering the optical path of an incident ray op which is incident onto the incident surface 101a of the incident side prism 101 from the side where the gate trace Ge1 is formed, since the incident ray op passes through the gate affecting area Ge1m in the incident side prism 101, the incident ray op may be affected by birefringence or the like. The incident ray op, after passing the aperture stop 104, is bent in a direction away from the gate trace Ge1. When the incident ray op is incident onto the imaging side prism 102, the incident ray op propagates in the imaging side prism 102 in a region away from the gate affecting area Ge2m. This arrangement keeps the incident ray op from passing both through the gate affecting area Ge1m of the incident side prism 101 and the gate affecting area Ge2m of the imaging side prism 102. With this arrangement, an influence of residue birefringence can be alleviated, which eliminates likelihood that substantially a half region of a displayed image may be affected by an influence of birefringence or the like.

The injection molding using the resin material is suitable for mass production and is advantageous in forming a concave incident or exit surface of high precision in a reflecting prism. However, according to the injection molding, it is impossible to fabricate a reflecting prism having a high refractive index in light of a fact that a resin material is used. In view of this, it is desirable to fabricate a prism having a high refractive index and high precision according to glass molding by heating a glass material having a high refractive index in a mold having a shape of a prism under pressurization. Use of a prism having a high refractive index enables to shorten the optical path length and suppress generation of aberration on a refracting surface, which makes it possible to realize miniaturization of the zoom optical system 100, and reduction of the number of lens elements, and is advantageous in producing a compact digital apparatus.

<Description on Digital Apparatus Incorporated with Zoom Optical System>

Figure 7A:
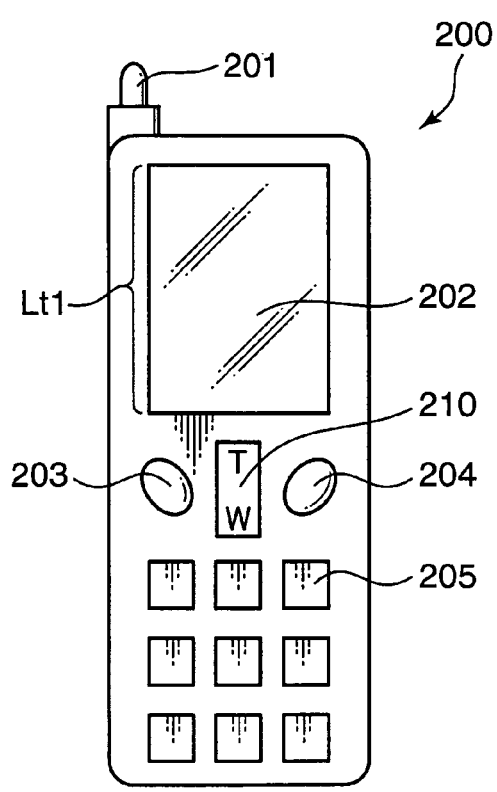
Figure 7B:
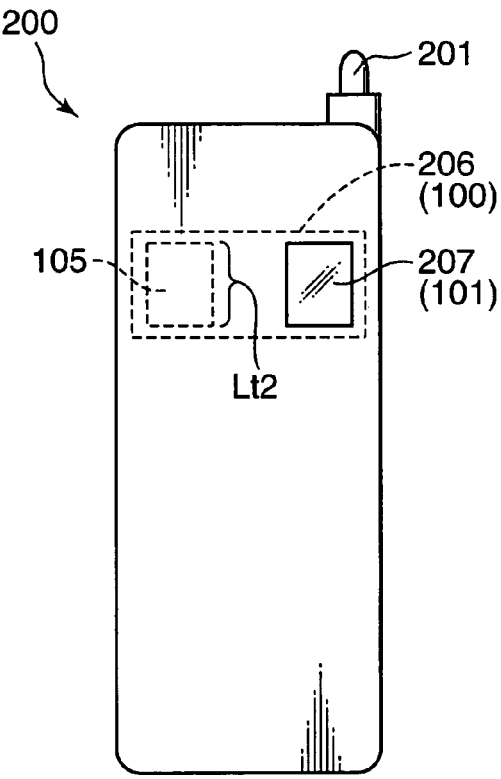

Next, a digital apparatus incorporated with the zoom optical system 100 is described. FIGS. 7A and 7B are external schematic views of a camera phone 200 as an embodiment of the digital apparatus embodying the present invention. In the embodiment of the invention, examples of the digital apparatus include a digital still camera, a digital video camera, a digital video unit, a personal digital assistant (PDA), a personal computer, a mobile computer, and peripheral devices thereof such as a mouse, a scanner, and a printer. The digital still camera or the digital video camera corresponds to an imaging lens device which converts, after optically reading a video image of a subject, the video image into electrical signals using a semiconductor device, and stores the electrical signals into a storage medium such as a flash memory. Further, in the embodiment of the invention, the digital apparatus includes a mobile phone, a PDA, a personal computer, a mobile computer, and peripheral devices thereof each having specifications of incorporating a compact imaging lens device for optically reading a still image or a video image of a subject.

FIG. 7A shows an operating face of the camera phone 200, and FIG. 7B shows a back face of the camera phone 200. The camera phone 200 includes at an upper part thereof an antenna 201, and on the operating face thereof a rectangular display 202 having a longer side Lt1 extending in a vertical direction on the plane of FIG. 7A, a mode switchover button 203 for activating the image shooting mode and for switching over the image shooting mode between still image shooting and moving image shooting, a shutter button 204, a dial button 205, and a zoom button 210 for controlling zooming. The symbol "T" indicating the telephoto limit of the optical system is marked on an upper end portion of the zoom button 210, and the symbol "W" indicating the wide angle limit of the optical system is marked on a lower end portion of the zoom button 210. The zoom button 210 is constituted of a two-contact switch constructed such that telephoto shooting or wide-angle shooting is allowed in response to pressing of the upper end portion or the lower end portion of the zoom button 210.

An imaging lens device (camera) 206 including a zoom optical system 100, which is a feature of the invention, and an image sensor 105 such as a CCD sensor are incorporated in the camera phone 200. A taking lens element 207 of the imaging lens device 206 is exposed out of the back face of the camera phone 200 for receiving light representing an optical image of a subject. An incident surface 101a of an incident side prism 101 is arranged on the back face of the taking lens element 207. In other words, the incident surface of the taking lens device 206 for passing incident light of a subject and the display 202 are arranged on the back face and the operating face of the camera phone 200, respectively. With this arrangement, an image acquired through the taking lens device 206 can be captured while the image is displayed on the display 202.

The image sensor 105 is of a rectangular shape with an aspect ratio of an imaging area at 4:3, for instance. An image sensor of a multi-purpose use is generally of a rectangular shape. It is desirable to incorporate the imaging lens device 206 including the image sensor 105 in the camera phone 200 as shown in FIGS. 7A and 7B, considering the arrangement relation with the rectangular display 202.

Specifically, in the case where the display 202 has the longer side Lt1 extending in the vertical direction on the plane of FIG. 7A, preferably, the image sensor 105 has a longer side Lt2 extending in a vertical direction on the plane of FIG. 7B. In other words, it is desirable to assemble the display 202 and the image sensor 105 in such a manner that the longer side Lt1 of the display 202 and the longer side Lt2 of the image sensor 105 are aligned parallel to each other in the same direction. Thereby, an optical image of a subject that has been incident through the taking lens device 207 and captured on the rectangular imaging area of the image sensor 105 is effectively displayed on the rectangular display 202.

More specifically, if the longer side Lt1 of the display 202 and the longer side Lt2 of the image sensor 105 are aligned parallel to each other, the longer side direction of the image captured by the image sensor 105 and the longer side direction of the display image are coincident with each other. With this arrangement, an image can be effectively displayed on the display area of the display 202 to thereby enable to display the image enlargedly. In other words, this arrangement enables image display of maximally utilizing the display area of the display 202, which is advantageous in confirming the image composition in image shooting or the like.

The taking lens device 206 may include a plane parallel plate corresponding to an optical low-pass filter or the like, in addition to the zoom optical system 100 for forming an optical image of a subject. Examples of the optical low-pass filter include, for instance, a birefringent low-pass filter made of a crystal or a like material whose crystallographic axis direction has been regulated, and a phase-type low-pass filter capable of realizing required optical cutoff frequency characteristics by diffraction effect.

An optical low-pass filter may not be an essential element. Further alternatively, an infrared cut filter may be provided in place of an optical low-pass filter to reduce a noise included in an image signal outputted from the image sensor 105. In this case, it is desirable that the reflecting prism has an infrared blocking function as mentioned above. Further alternatively, it is possible to allow a single element to exhibit functions of an infrared cut filter and an optical low-pass filter by applying infrared reflecting coat on a surface of an optical low-pass filter.

An image shooting operation of the camera phone 200 having the above construction is described below. In shooting a still image, the image shooting mode is activated by pressing the mode switchover button 203 one time. In this embodiment, depressing the mode switchover button 203 one time activates the still image shooting mode, and depressing the mode switching button 203 one more time while the still image shooting mode is activated switches over the image shooting mode to the moving image shooting mode. Specifically, a controller (not shown) of the camera phone 200 has a function of causing the imaging lens device 206 and the image sensor 105 to execute at least one of shooting a still image of a subject on the object side and shooting a moving image of the subject upon receiving designation from the mode switchover button 203.

When the still image shooting mode is activated, a subject image is cyclically captured by the image sensor 105 such as a CCD sensor through the imaging lens device 206. Then, after the acquired image data is transferred to a memory for display, the image is displayed on the display 202. The photographer can move the subject image to an intended position within the display screen while viewing the image through the display 202. When the photographer depresses the shutter button 204 with the subject image being located at the intended position, a still image of the subject is obtained. Thus, image data representing the captured still image is stored in a memory for storing the still image data.

When zoom shooting is performed under the condition that a subject is located away from the photographer, or the photographer wishes to capture the subject enlargedly, the photographer depresses the upper end portion of the zoom button 210 where the symbol "T" is marked. Then, the state that the zoom button 210 is being depressed toward the telephoto limit is detected, and a lens driving for zooming is executed for a time duration while the zoom button 210 is depressed to carry out continuous zooming. If the photographer wishes to reduce the magnification of the subject image in an excessive zooming, the photographer depresses the lower end portion of the zoom button 210 where the symbol "W" is marked. Then, the state that the zoom button 210 is being depressed toward the wide-angle limit is detected, and a continuous zooming toward magnification reduction is carried out for a time duration while the zoom button 210 is depressed. In this way, the photographer can vary the zoom ratio with use of the zoom button 210, even if the subject is located away from the photographer. Similarly to ordinary life-size shooting, the photographer can capture an enlarged still image by moving the subject image within the display screen to an intended position, and by depressing the shutter button 204 with the subject image being located at the intended position.

In the case of conducting moving image shooting, after the still image shooting mode is activated by depressing the mode switchover button 203 one time, the mode switchover button 203 is depressed once again to change the image shooting mode to the moving image shooting. Thereafter, similarly to the still image shooting, the photographer views the subject image through the display 202 to move the subject image captured through the imaging lens device 206 to an intended position within the display screen. During the moving image shooting, the photographer can vary the zoom ratio of the subject image desirably by manipulating the zoom button 210. When the photographer depresses the shutter button 204 in this state, the photographer can start moving image shooting. During the moving image shooting, the zoom ratio of the subject image can be arbitrarily changed by manipulating the zoom button 210. When the photographer depresses the shutter button 204 again in this state, the moving image shooting ends. The captured moving image data is sent to a memory for displaying the moving image on the display 202, and is also sent to a memory for storing the moving image data for storage.

The construction of the zoom button 210 in the camera phone 220 is not limited to the foregoing. The dial button 205 may be used as a zoom button. Alternatively, it is possible to use a member having two-directional zooming function, namely, enlargement and reduction, such as a rotary dial member which is rotatably supported about an axis of rotation on the operating face where the dial button is installed.

In the foregoing embodiment, the longer side Lt1 of the display 202 and the longer side Lt2 of the image sensor 105 are aligned parallel to each other in the vertical directions on the plane of FIGS. 7A and 7B. Alternatively, it is possible to align the longer side Lt1 of the display 202 and the longer side Lt2 of the image sensor 105 parallel to each other in a certain direction, e.g., transverse directions, on the plane of FIGS. 7A and 7B. Such an altered arrangement enables image display of maximally utilizing the display area of the display 202, which contributes to effective confirmation of the image composition in image shooting.

The same idea as applied to the camera phone 200 is applied to various digital apparatuses incorporated with a display as a display device, such as a foldable camera phone, a digital still camera, a digital video camera, a PDA, a personal computer, a mobile computer, and peripheral devices thereof.

FIGS. 8A and 8B are external schematic views each showing a foldable camera phone 300. FIG. 8A shows an operating face of the camera phone 300, and FIG. 8B shows a back face of the camera phone 300. The camera phone 300 is of a foldable type, wherein a first casing 310 and a second casing 320 are coupled to each other by a hinge member 330. A vertically elongated display 311 is provided on the operating face of the first casing 310, and a key entering section 321 serving as an operating section is provided on the operating face of the second casing 320.

The camera phone 300 is constructed in such a manner that a taking lens device 206 including a zoom optical system 100, and an image sensor 105 are arranged in the first casing 310, and a taking lens element 207 of the taking lens device 206 is exposed out of the back face of the first casing 310. Specifically, an incident surface of the taking lens device 206 for receiving an optical image of a subject and a display 311 are arranged on the back face and the operating face of the first casing 310, respectively. With this arrangement, an image can be captured while the image acquired through the taking lens device 206 is displayed on the display 311. The display 311 and the image sensor 105 are assembled in such a manner that a longer side Lt1 of the display 311 and a longer side Lt2 of the image sensor 105 are aligned parallel to each other in the same direction. Thereby, an optical image of a subject that has been incident through the taking lens element 207 and captured on a rectangular imaging area of the image sensor 105 can be effectively displayed on the rectangular display 311 in image shooting.

FIGS. 9A and 9B are external schematic views of a PDA, wherein FIG. 9A shows an operating face of the PDA 400, and FIG. 9B shows a back face thereof. A transversely elongated display 401, and a key entering section 402 serving as an operating section are provided on the operating face of the PDA 400.

The PDA 400 is constructed in such a manner that a taking lens device 206 including a zoom optical system 100, and an image sensor 105 are incorporated in a housing of the PDA 400, with a taking lens element 207 of the taking lens device 206 being exposed out of the back face of the PDA 400. Specifically, an incident surface of the taking lens device 206 for receiving an optical image of a subject and the display 401 are arranged on the back face and the operating face of the PDA 400, respectively. With this arrangement, an image can be captured while the image acquired through the taking lens device 206 is displayed on the display 401. The display 401 and the image sensor 105 are assembled in such a manner that a longer side Lt1 of the display 401 and a longer side Lt2 of the image sensor 105 are aligned parallel to each other in a certain direction, in this case, a horizontal direction. Thereby, an optical image of a subject that has been incident through the taking lens element 207 and captured on a rectangular imaging area of the image sensor 105 can be effectively displayed on the rectangular display 401 in image shooting.

Hereinafter, the terms "concave", "convex", and "meniscus" are used regarding lens elements. It should be noted that these terms represent the respective configurations of a lens element in the vicinity of the optical axis, namely, near the central part of the lens element, and do not indicate the respective configurations of the entirety of the lens element or a periphery of the lens element. As far as the lens element is spherical, the configuration of the lens element does not matter. However, since the configuration of an aspherical lens element is generally different in the vicinity of the central part thereof and in a periphery thereof, the above definitions on the terms are necessary. The aspherical lens element includes lens elements having surfaces of different configurations such as a paraboloidal surface, an ellipsoidal surface, a hyperboloidal surface, and a quartic surface.

Further, throughout the specification and the claims, the optical power of a single lens element and the optical power of each single lens element constituting a cemented lens element indicate a power of the single lens element itself assuming that both of the lens surfaces of the single lens element have a boundary with the air.

In the following, embodiments of the zoom optical system 100 as shown in FIG. 1, specifically, exemplified arrangements of the zoom optical system 100 constituting the imaging lens device 206 to be loaded in the camera phone 200 as shown in FIGS. 7A and 7B, the camera phone 300 as shown in FIGS. 8A and 8B, or the personal digital assistant (PDA) 400 as shown in FIGS. 9A and 9B are described referring to the drawings.

First Embodiment

Figure 10:
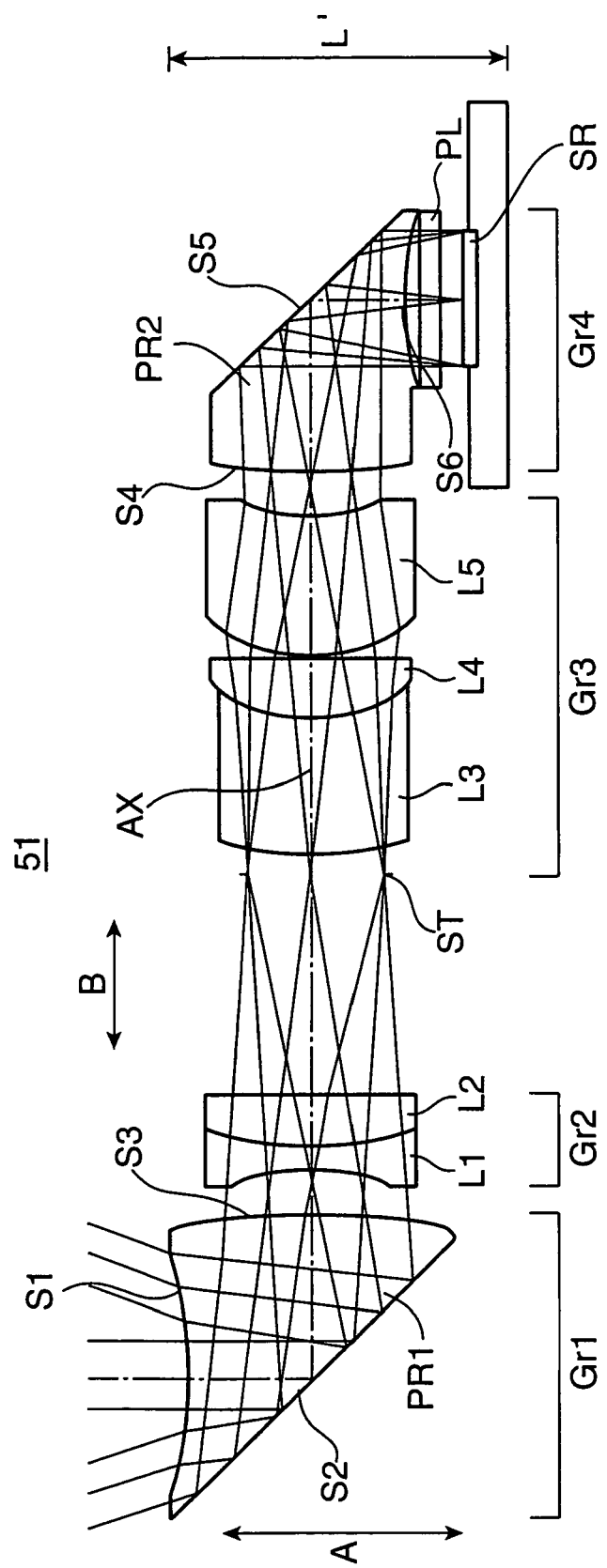
FIG. 10 is a cross-sectional view taken along an optical axis in a first embodiment of the zoom optical system.

FIG. 10 is a cross-sectional view of a lens group arrangement of a zoom optical system 51 in a first embodiment taken along the optical axis (AX). FIG. 10 shows an arrangement of optical devices at an infinite focal point. Also, FIG. 10, and FIGS. 11 through 16 each schematically show an optical path along which an incident ray from the object side propagates, with its axis serving as the optical axis (AX).

As shown in FIG. 10, the zoom optical system 51 has, from the object side in this order along the optical path, a first lens group (Gr1) including a first reflecting prism (PR1) having a negative optical power as a whole, which corresponds to the incident side prism 101 shown in FIG. 1; a second lens group (Gr2) having a negative optical power as a whole, and including a cemented lens element composed of a negative biconcave lens element (L1) and a positive biconvex lens element (L2); a third lens group (Gr3) having a positive optical power as a whole, and including an aperture stop (ST), a cemented lens element composed of a negative meniscus lens element (L3) convex to the object side and a positive biconvex lens element (L4), and a positive meniscus lens element (L5) convex to the object side; and a fourth lens group (Gr4) including a second reflecting prism (PR2) having a positive optical power as a whole, which corresponds to the imaging side prism 102 shown in FIG. 1. The optical axes of the second lens group (Gr2) and the third lens group (Gr3) are coincident with the axis (AX) of the optical path between the first reflecting prism (PR1) and the second reflecting prism (PR2). Further, a plane parallel plate (PL) and an image sensor (SR) are arranged on the imaging side of the second reflecting prism (PR2). The image sensor (SR) has an aspect ratio of e.g. 3:4.

The first reflecting prism (PR1) has an incident surface (S1) of a negative optical power, an exit surface (S3) of a positive optical power, and a planar reflecting surface (S2) arranged on the optical path between the incident surface (S1) and the exit surface (S3). The second reflecting prism (PR2) has an incident surface (S4) of a positive optical power, an exit surface (S6) of a negative optical power, and a planar reflecting surface (S5) arranged on the optical path between the incident surface (S4) and the exit surface (S6). In this embodiment, the reflecting surface (S2) formed on the first reflecting prism (PR1) and the reflecting surface (S5) formed on the second reflecting prism (PR2) are each adapted to bend an incident ray at about 90 degrees to direct the reflected ray toward the second lens group (Gr2) and the plane parallel plate (P1), respectively.

The zoom optical system 51 shown in FIG. 10 is a zoom optical system, wherein an incident ray is bent in the shorter side direction of the image sensor (SR). The transverse directions in FIG. 10 correspond to the shorter side direction, and the directions shown by the arrows A in FIG. 11 correspond to the thickness direction of the camera phone 200 shown in FIGS. 7A and 7B.

Figure 11:
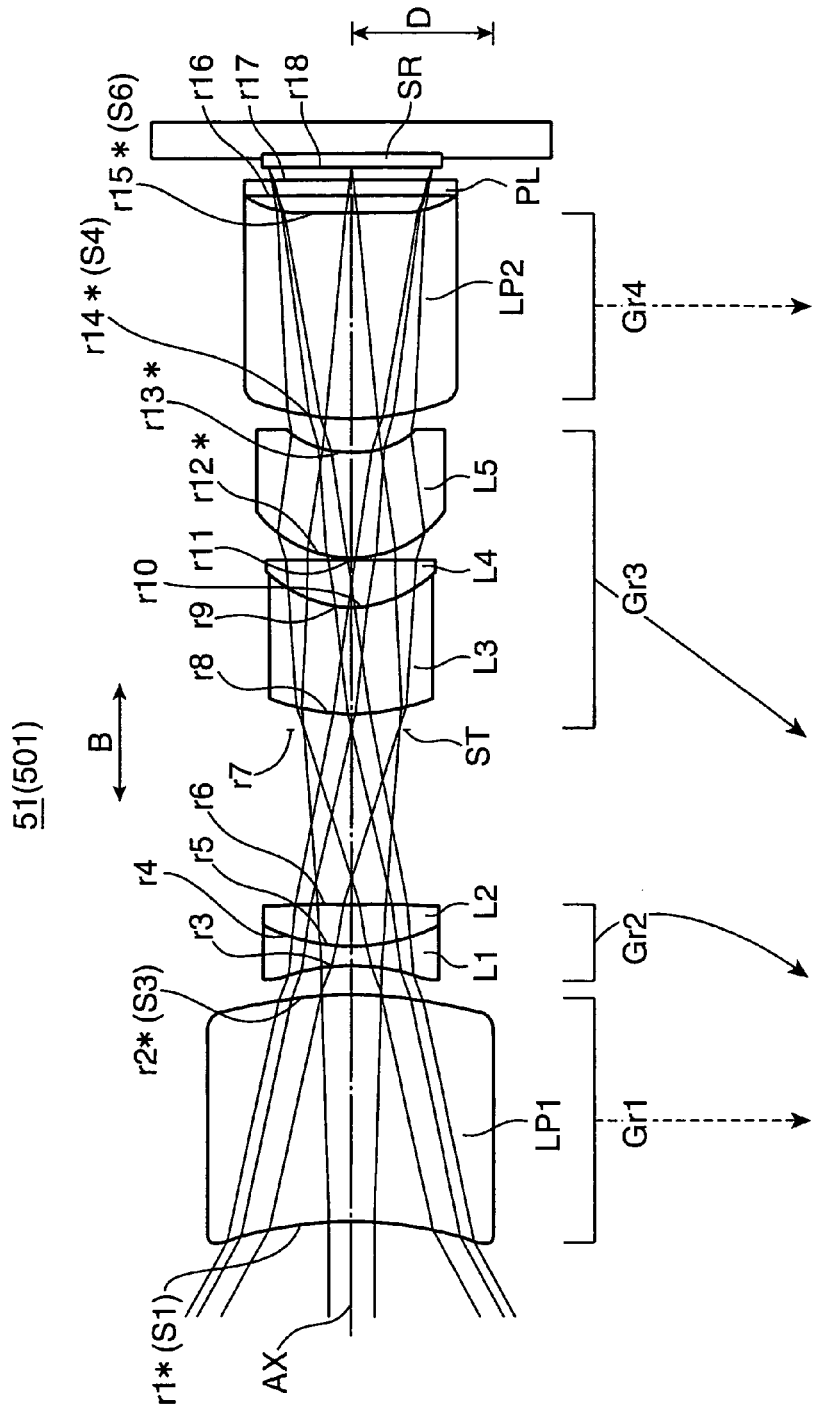
FIG. 11 is a cross-sectional view taken along the optical axis in the first embodiment of the zoom optical system, wherein lens elements having a function substantially equivalent to the function of reflecting prisms shown in FIG. 10 are used in place of the reflecting prisms.

FIG. 11 is an illustration showing an arrangement of the zoom optical system 51, wherein lens elements (LP1, LP2) having a function substantially equivalent to the function of the first and the second reflecting prisms (PR1, PR2) shown in FIG. 10 are used in place of the first and second reflecting prisms (PR1, PR2) shown in FIG. 10, respectively. The surface denoted by ri (i=1, 2, 3, . . . ) shown in FIG. 11 indicates the i-th lens surface from the object side, and the surface ri marked with an asterisk (*) is an aspherical surface. The direction of the arrows D in FIG. 11 corresponds to the diagonal direction of the image sensor (SR).

The number of the lens elements constituting the cemented lens element is not the number of the cemented lens element itself but is the number of single lens elements constituting the cemented lens element. For instance, if the cemented lens element is constituted of three single lens elements, the number of the lens elements constituting the cemented lens element is three.

In the construction as mentioned above, an incident ray from the object side in FIG. 10 is incident onto the incident surface (S1) of the first reflecting prism (PR1), bent at about 90 degrees on the reflecting surface (S2), and then goes out from the exit surface (S3). Thereafter, the exit ray propagates through the second lens group (Gr2) and the third lens group (Gr3), and is incident onto the incident surface (S4) of the second reflecting prism (PR2). Subsequently, the incident ray is bent at about 90 degrees on the reflecting surface (S5), and goes out of the exit surface (S6) for forming an optical image of the object. The optical image formed by these optical devices of the zoom optical system 51 propagates through the plane parallel plate (PL) arranged in proximity to the second reflecting prism (PR2). At this time, the optical image is corrected in such a manner that a so-called alias noise generated in converting the optical image signal into an electrical signal by the image sensor (SR) is minimized. The plane parallel plate (PL) corresponds to an optical low-pass filter, an infrared cut filter, a cover glass for the image sensor, or an equivalent element.

Lastly, the optical image corrected by the plane parallel plate (PL) is converted into an electrical signal by the image sensor (SR). The electrical signal undergoes a predetermined digital image processing, an image compression processing or a like processing according to needs, and is recorded as a digital video signal into a memory device of the digital apparatus such as the camera phone 200 as shown in FIGS. 7A and 7B, the camera phone 300 as shown in FIGS. 8A and 8B, or the PDA 400 as shown in FIGS. 9A and 9B, or transmitted to another digital apparatus by a cable or wirelessly.

Hereinafter, an intermediate point between the wide angle limit (W) where the focal length is the shortest, namely, the angle of view is the largest, and the telephoto limit (W) where the focal length is the longest, namely, the angle of view is the smallest is called as "mid point (M)".

In the lens arrangement of the first embodiment as shown in FIG. 10, the first reflecting prism (PR1) and the second reflecting prism (PR2) are fixed, the second lens group (Gr2) makes a U-turn in such a manner that the second lens group (Gr2) comes closest to the image sensor around the mid point (M), and the third lens group (Gr3) is substantially linearly moved toward the object during zooming from the wide angle limit (W) to the telephoto limit (T) as shown in FIG. 11. At this time, both the second lens group (Gr2) and the third lens group (Gr3) are moved in the optical axis direction of the lens groups for zooming. It should be noted that the moving direction, the moving amount, and other parameter of the lens groups are changeable depending on the optical power of the lens groups or the like.

It is desirable to fix the first reflecting prism (PR1) and the second reflecting prism (PR2) and move at least one of the second lens group (Gr2) and the third lens group (Gr3) in parallel to the optical axis, namely, in the direction of the arrows B in FIG. 10 in focusing a subject from an infinite focal point to a closest focal point. This arrangement enables focusing without changing the thickness of the entirety of the zoom optical system 51 in the direction of the arrows A in FIG. 10.

In the following, as in the case of the first embodiment, the lens arrangements of the second embodiment and the third embodiment are described in this order referring to the drawings. Elements in FIGS. 12 and 14 equivalent to those in FIG. 10 are denoted by the same references, and elements in FIGS. 13 and 15 equivalent to those in FIG. 11 are denoted by the same reference numerals. It should be noted, however, that the elements of the like reference numerals are not necessarily identical to each other. For instance, although the first reflecting prisms in FIGS. 10, 12, and 14 are denoted by the same reference numeral (PR1), this does not mean that the first reflecting prisms in FIGS. 10, 12, and 14 are identical to each other.

Second Embodiment

Figure 12:
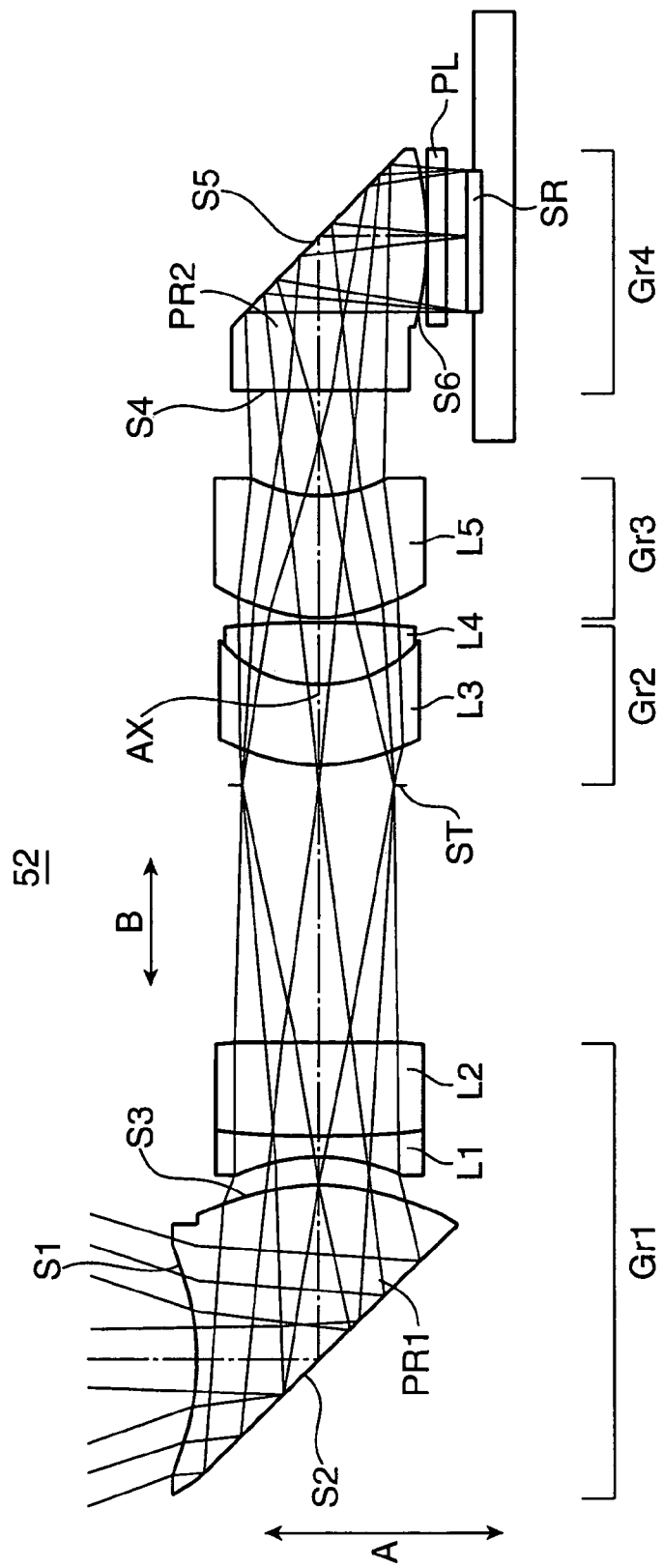
FIG. 12 is a cross-sectional view taken along an optical axis in a second embodiment of the zoom optical system.

FIG. 12 is a cross-sectional view of a lens group arrangement of a zoom optical system 52 in a second embodiment taken along the optical axis (AX). FIG. 12 shows an arrangement of optical devices at an infinite focal point.

As shown in FIG. 12, the zoom optical system 52 has, from the object side in this order along the optical path, a first lens group (Gr1) including a first reflecting prism (PR1) having a negative optical power, and a cemented lens element having a negative optical power as a whole, and composed of a negative biconcave lens element (L1) and a positive biconvex lens element (L2); a second lens group (Gr2) having a negative optical power as a whole, and including an aperture stop (ST), and a cemented lens element composed of a negative meniscus lens element (L3) convex to the object side, and a positive biconvex lens element (L4); a third lens group (Gr3) including a positive meniscus lens element (L5) convex to the object side; and a fourth lens group (Gr4) including a second reflecting prism (PR2) having a positive optical power as a whole. The optical axes of the second lens group (Gr2) and the third lens group (Gr3) are coincident with the axis (AX) of the optical path between the first reflecting prism (PR1) and the second reflecting prism (PR2). Further, a plane parallel plate (PL) and an image sensor (SR) are arranged on the imaging side of the second reflecting prism (PR2).

The first reflecting prism (PR1) has an incident surface (S1) of a negative optical power, an exit surface (S3) of a positive optical power, and a planar reflecting surface (S2) arranged on the optical path between the incident surface (S1) and the exit surface (S3). The second reflecting prism (PR2) has an incident surface (S4) of a positive optical power, an exit surface (S6) of a positive optical power, and a planar reflecting surface (S5) arranged on the optical path between the incident surface (S4) and the exit surface (S6). In this embodiment, the reflecting surface (S2) formed on the first reflecting prism (PR1) and the reflecting surface (S5) formed on the second reflecting prism (PR2) are each adapted to bend an incident ray at about 90 degrees to direct the reflected ray toward the second lens group (Gr2) and the plane parallel plate (PL), respectively.

The zoom optical system 52 shown in FIG. 12 is a zoom optical system, wherein an incident ray is bent in the shorter side direction of the image sensor (SR). The directions shown by the arrows A in FIG. 12 correspond to the thickness direction of the camera phone 200 shown in FIGS. 7A and 7B.

Figure 13:
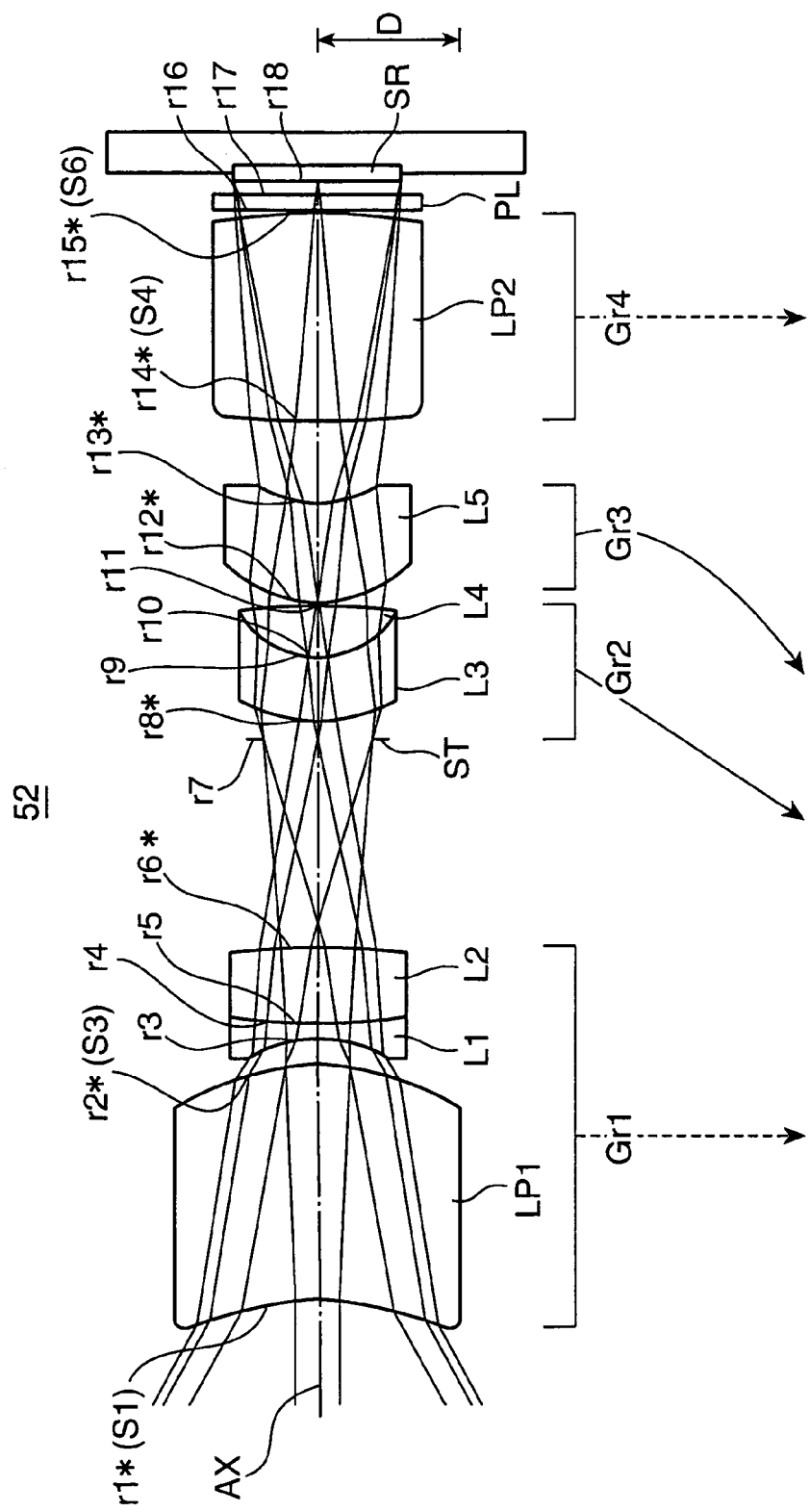
FIG. 13 is a cross-sectional view taken along the optical axis in the second embodiment of the zoom optical system, wherein a lens element having a function substantially equivalent to the function of a reflecting prism shown in FIG. 12 is used in place of the reflecting prism.
Figure 14:
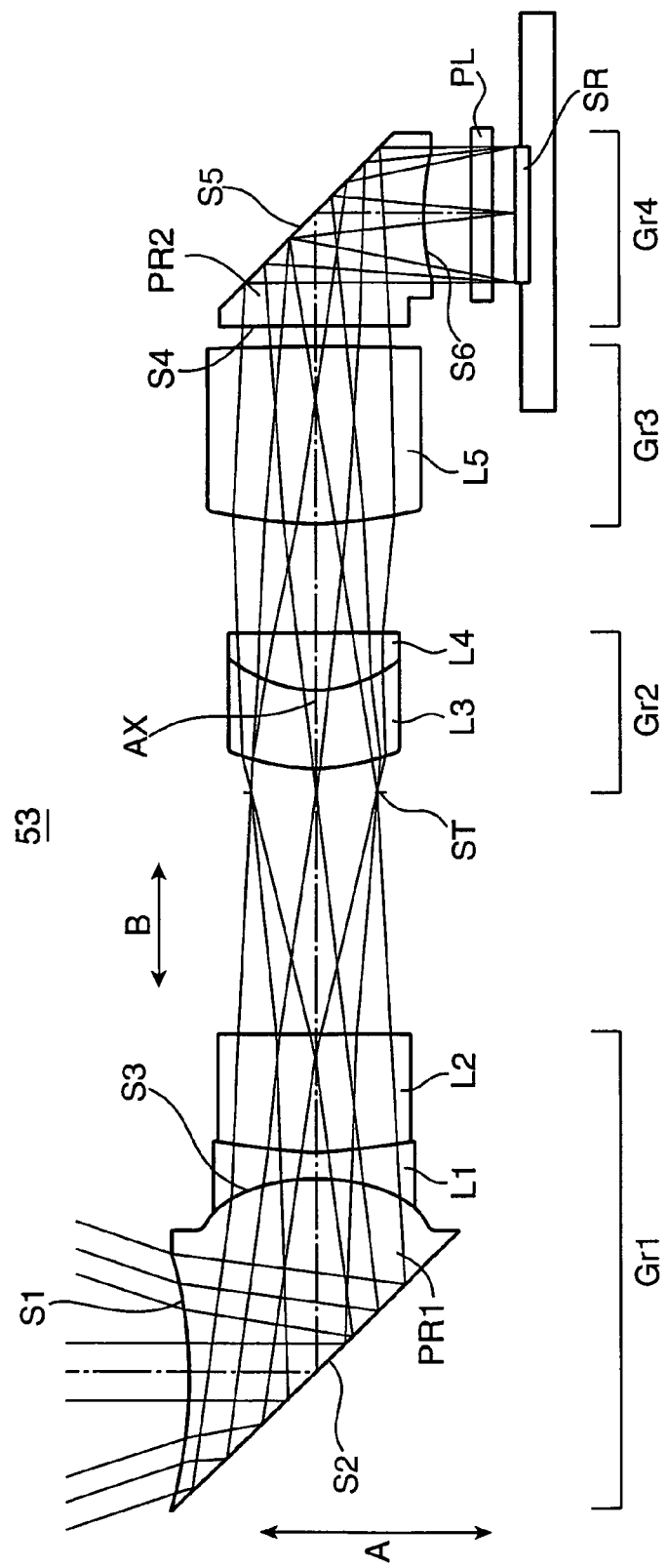
FIG. 14 is a cross-sectional view taken along an optical axis in a third embodiment of the zoom optical system.

FIG. 13 is an illustration showing an arrangement of the zoom optical system 52, wherein lens elements (LP1, LP2) having a function substantially equivalent to the function of the first and the second reflecting prisms (PR1, PR2) shown in FIG. 12 are used in place of the first and the second reflecting prisms (PR1, PR2) shown in FIG. 12, respectively. The direction of the arrows D in FIG. 13 corresponds to the diagonal direction of the image sensor (SR).

In the construction as mentioned above, an incident ray from the object side in FIG. 12 is bent at about 90 degrees on the reflecting surface (S2), propagates through the second lens group (Gr2) and the third lens group (Gr3), and is bent at about 90 degrees on the reflecting surface (S5) of the second reflecting prism (PR2) for forming an optical image of a subject on the light receiving plane of the image sensor (SR).

In the lens arrangement of the second embodiment as shown in FIG. 12, the first reflecting prism (PR1) and the second reflecting prism (PR2) are fixed, the second lens group (Gr2) is substantially linearly moved toward the object, and the third lens group (Gr3) is moved toward the object with the distance to the second lens group (Gr2) being changed during zooming from the wide angle limit (W) to the telephoto limit (T) as shown in FIG. 13. At this time, both the second lens group (Gr2) and the third lens group (Gr3) are moved in the optical axis direction of the lens groups for zooming.

It is desirable to fix the first reflecting prism (PR1) and the second reflecting prism (PR2) and move at least one of the second lens group (Gr2) and the third lens group (Gr3) in parallel to the optical axis, namely, in the direction of the arrows B in FIG. 12 in focusing a subject from an infinite focal point to a closest focal point. This arrangement enables focusing without changing the thickness of the entirety of the zoom optical system 52 in the direction of the arrows A in FIG. 12.

Third Embodiment

FIG. 14 is a cross-sectional view of a lens group arrangement of a zoom optical system 53 in a third embodiment taken along the optical axis (AX). FIG. 14 shows an arrangement of optical devices at an infinite focal point.

As shown in FIG. 14, the zoom optical system 53 has, from the object side in this order along the optical path, a first lens group (Gr1) having a negative optical power as a whole, and including a first reflecting prism (PR1), and a cemented lens element composed of a negative biconcave lens element (L1) and a positive biconvex lens element (L2); a second lens group (Gr2) having a positive optical power as a whole, and including an aperture stop (ST), and a cemented lens element composed of a negative meniscus lens element (L3) convex to the object side and a positive biconvex lens element (L4); a third lens group (Gr3) including a positive meniscus lens element (L5) convex to the object side; and a fourth lens group (Gr4) including a second reflecting prism (PR2) having a negative optical power as a whole. The optical axes of the second lens group (Gr2) and the third lens group (Gr3) are coincident with the axis (AX) of the optical path between the first reflecting prism (PR1) and the second reflecting prism (PR2). Further, a plane parallel plate (PL) and an image sensor (SR) are arranged on the imaging side of the second reflecting prism (PR2).

The first reflecting prism (PR1) has an incident surface (S1) of a negative optical power, an exit surface (S3) of a positive optical power, and a planar reflecting surface (S2) arranged on the optical path between the incident surface (S1) and the exit surface (S3). The second reflecting prism (PR2) has an incident surface (S4) of a positive optical power, an exit surface (S6) of a negative optical power, and a planar reflecting surface (S5) arranged on the optical path between the incident surface (S4) and the exit surface (S6). In this embodiment, the reflecting surface (S2) formed on the first reflecting prism (PR1) and the reflecting surface (S5) formed on the second reflecting prism (PR2) are each adapted to bend an incident ray at about 90 degrees to direct the reflected ray toward the second lens group (Gr2) and the plane parallel plate (PL), respectively.

Similarly to the zoom optical systems 51 and 52 shown in FIGS. 10 and 12, the zoom optical system 53 shown in FIG. 14 is a zoom optical system, wherein an incident ray is bent in the shorter side direction of the image sensor (SR). The directions shown by the arrows A in FIG. 14 correspond to the thickness direction of the camera phone 200 shown in FIGS. 7A and 7B.

Figure 15:
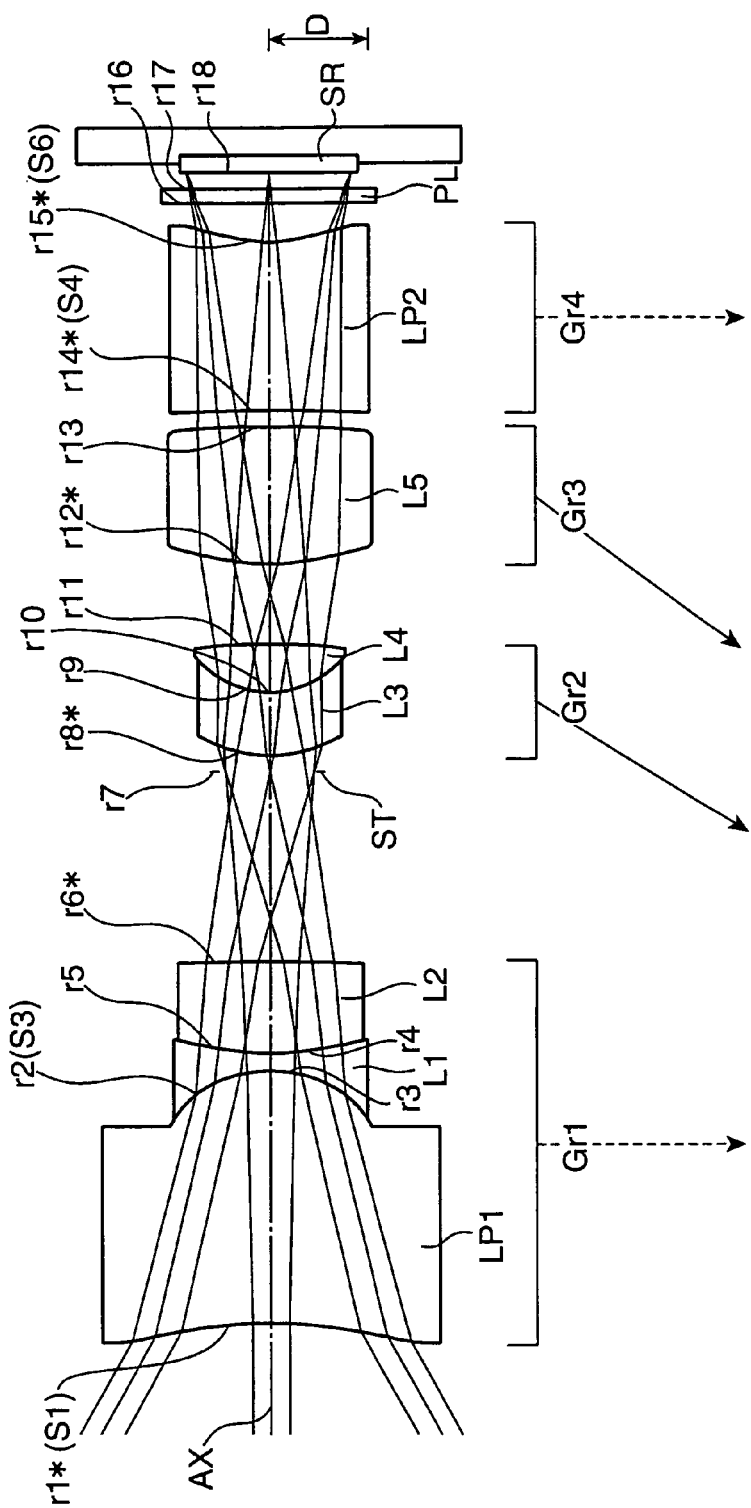
FIG. 15 is a cross-sectional view taken along the optical axis in the third embodiment of the zoom optical system, wherein a lens element having a function substantially equivalent to the function of a reflecting prism shown in FIG. 14 is used in place of the reflecting prism.

FIG. 15 is an illustration showing an arrangement of the zoom optical system 53, wherein lens elements (LP1, LP2) having a function substantially equivalent to the function of the first and the second reflecting prisms (PR1, PR2) shown in FIG. 14 are used in place of the first and second reflecting prisms (PR1, PR2) shown in FIG. 14, respectively. The direction of the arrows D in FIG. 15 corresponds to the diagonal direction of the image sensor (SR).

In the construction as mentioned above, an incident ray from the object side in FIG. 14 is bent at about 90 degrees on the reflecting surface (S2), propagates through the second lens group (Gr2) and the third lens group (Gr3), and is bent at about 90 degrees on the reflecting surface (S5) of the second reflecting prism (PR2) for forming an optical image of a subject on the light receiving plane of the image sensor (SR).

In the lens arrangement of the third embodiment as shown in FIG. 14, the first reflecting prism (PR1) and the second reflecting prism (PR2) are fixed, the second lens group (Gr2) is moved toward the object, and the third lens group (Gr3) is moved toward the object with the distance to the second lens group (Gr2) being changed during zooming from the wide angle limit (W) to the telephoto limit (T) as shown in FIG. 15. At this time, both the second lens group (Gr2) and the third lens group (Gr3) are moved in the optical axis direction of the lens groups for zooming.

It is desirable to fix the first reflecting prism (PR1) and the second reflecting prism (PR2) and move at least one of the second lens group (Gr2) and the third lens group (Gr3) in parallel to the optical axis, namely, in the direction of the arrows B in FIG. 14 in focusing a subject from an infinite focal point to a closest focal point. This arrangement enables focusing without changing the thickness of the entirety of the zoom optical system 53 in the direction of the arrows A in FIG. 14.

In the first to the third embodiments as described above, preferably, a cover glass may be provided on the object side relative to the incident surface of the first reflecting prism (PR1) to keep the zoom optical system, particularly, the first reflecting prism (PR1) from being smeared. Since the thickness of the cover glass is generally small, there is no or less likelihood that providing the cover glass may unduly increase the thickness of the entirety of the optical system.

As mentioned above in each of the first through the third embodiments, the zoom optical system 51 (52 or 53) is constructed in such a manner that the two reflecting prisms each adapted to bend an incident ray at about 90 degrees for reflection are arranged in a state that the incident surface of the reflecting prism disposed on the object side along the optical path and the exit surface of the other reflecting prism are aligned substantially parallel to each other. This arrangement contributes to miniaturization of the zoom optical system.

Specifically, as shown in FIG. 11, for instance, if a zoom optical system 501 corresponding to the zoom optical system 51 shown in FIG. 10 is constructed without a reflecting prism, namely, without forming a reflecting surface for bending an incident ray at about 90 degrees for reflection, and the zoom optical system 501 is loaded in a camera phone corresponding to the camera phone 200 or the like, then, the thickness of the camera phone in the direction of the arrows B in FIG. 11, which corresponds to the thickness direction of the camera phone 200 shown in FIGS. 7A and 7B, is equal to or larger than the entire length of the zoom optical system 501. As a result, the thickness of the camera phone may be unduly increased, and the size of the camera phone 200 may be increased as a whole.

Figure 16:
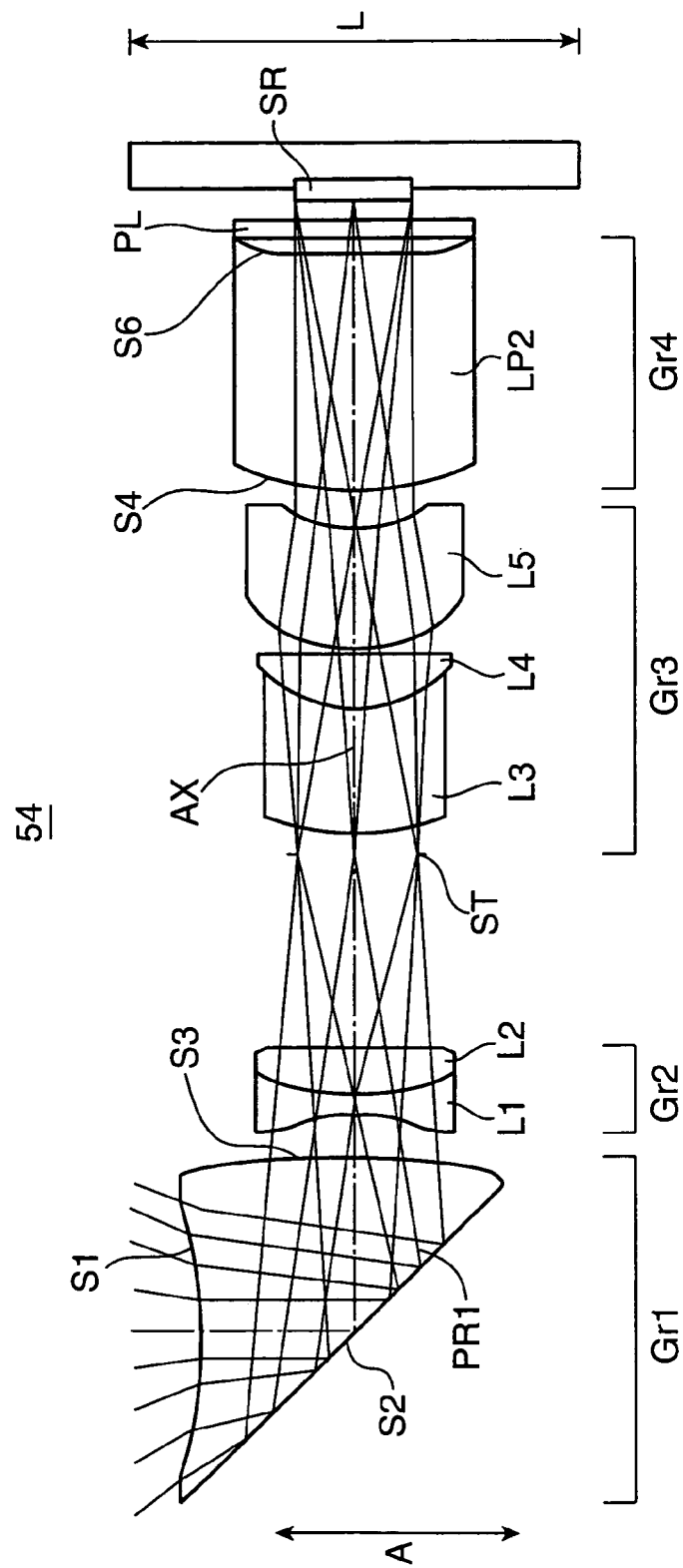
FIG. 16 is a cross-sectional view taken along the optical axis in the third embodiment of the zoom optical system, wherein a lens element having a function substantially equivalent to the function of a second reflecting prism shown in FIG. 10 is used in place of the second reflecting prism.
Figure 17A:
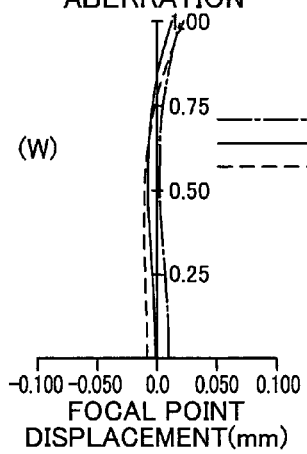
FIGS. 17A through 17I are aberration diagrams regarding spherical aberrations, astigmatisms, and distortion aberrations of lens groups in the zoom optical system in Example 1 with an infinite focal length.
Figure 17B:
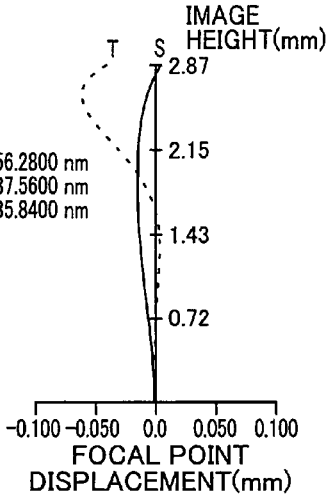
Figure 17C:
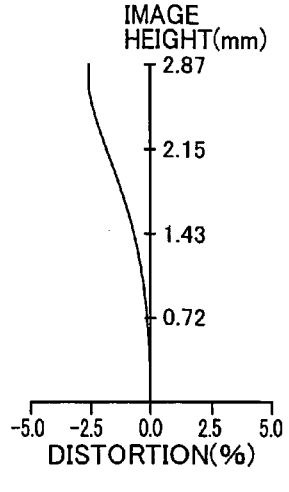
Figure 17D:
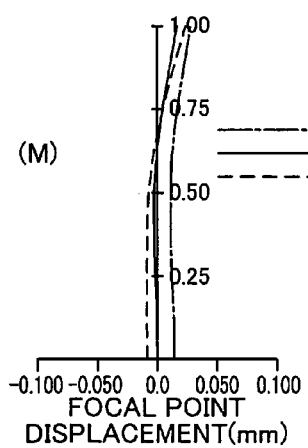
Figure 17E:
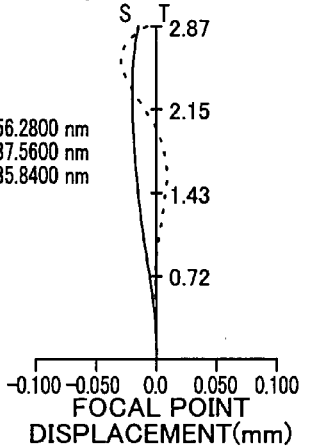
Figure 17F:
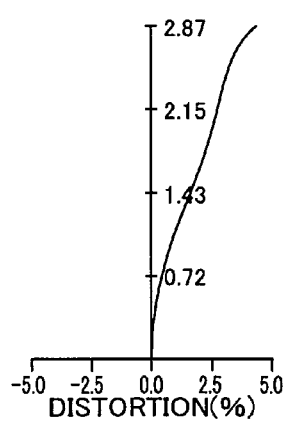
Figure 17G:
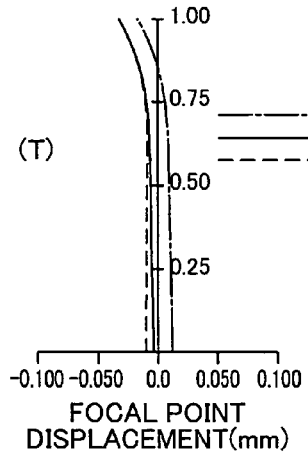
Figure 17H:
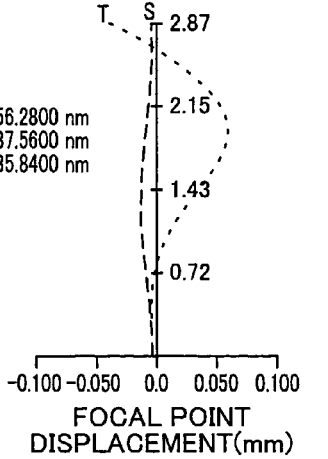
Figure 17I:
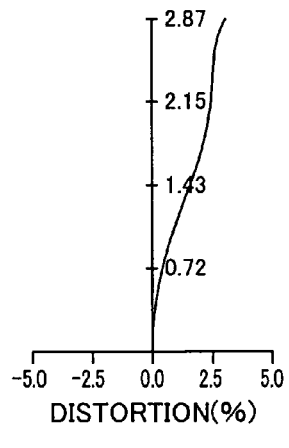
Figure 20A:
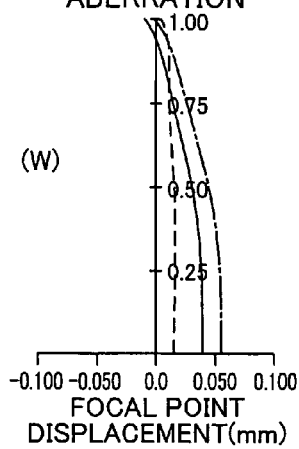
FIG. 20A through 20I are aberration diagrams regarding spherical aberrations, astigmatisms, and distortion aberrations of lens groups in the zoom optical system in Example 3 with a closest focal length.
Figure 20B:
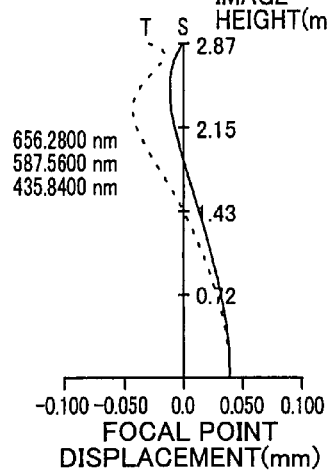
Figure 20C:
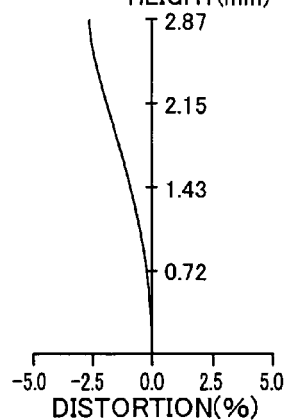
Figure 20D:
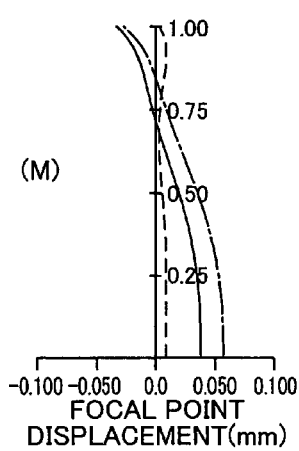
Figure 20E:
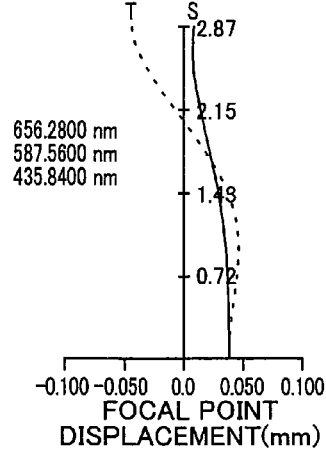
Figure 20F:
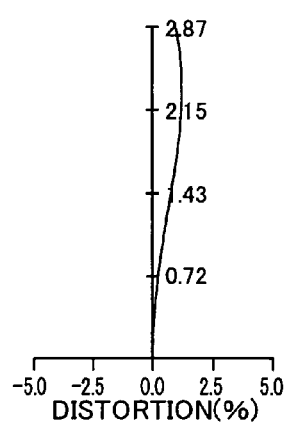
Figure 20G:
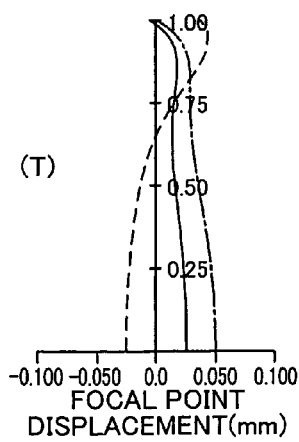
Figure 20H:
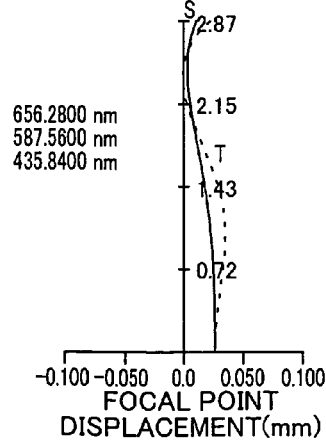
Figure 20I:
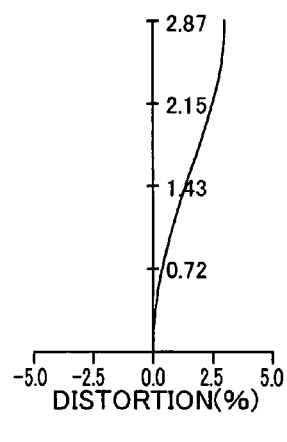

In view of the above, there may be proposed an arrangement of a zoom optical system 54 having one reflecting surface, as shown in FIG. 16. In this arrangement, a reflecting prism (PR1) is provided in place of the lens element (LP1) shown in FIG. 11. This arrangement is advantageous in decreasing the thickness of the camera phone in the direction of the arrows A, which partly contributes to miniaturization of the camera phone, as compared with the arrangement shown in FIG. 11.

It should be noted, however, that the image sensor (SR) is equipped with a packaging unit and an electrical wiring, and has a large size in the direction parallel with the light receiving plane of the image sensor (SR) due to this arrangement. Therefore, the thickness of the camera phone is equal to or larger than the size of the image sensor (SR) in the direction parallel with the light receiving plane, namely, is equal to or larger than the length L shown in FIG. 16. Thus, the arrangement as shown in FIG. 16 does not sufficiently contribute to miniaturization of the camera phone.

In view of the above, in the embodiment of the invention as shown in FIG. 10, the zoom optical system 51 provided with the two reflecting surfaces, namely, the first reflecting prism (PR1) and the second reflecting prism (PR2), in place of the lens elements (LP1, LP2) shown in FIG. 11, enables to minimize the camera phone 200 in the thickness direction thereof in light of the fact that the thickness direction of the zoom optical system 51 corresponds to the widthwise direction L'(<L) of the first reflecting prism (PR1) shown by the arrows A.

In the following, the zoom optical systems 51, 52, and 53 as the first through the third embodiments are described in detail referring to construction data, aberration diagrams and the like.

PRACTICAL EXAMPLES

Example 1

Construction data on the respective lens elements in the zoom optical system 51 as the first embodiment (Example 1) are described in Tables 1 and 2.

Table 1 indicates, from the left-side column thereof, the respective lens surface numbers, radii of curvature (unit: mm) of the respective lens surfaces, distances (unit: mm) between the respective lens surfaces in the optical axis direction, namely, axial distances between the respective lens surfaces at wide-angle limit (W), the mid point (M), and the telephoto limit (T) in an infinite focal state, refractive indices of the respective lens elements, and the Abbe numbers of the respective lens elements. The value in each blank column regarding the axial distance between the lens surfaces at the mid point (M) and the telephoto limit (T) is the same as that in the corresponding left-side column at the wide-angle limit (W). The axial distances are distances calculated on the presumption that the medium residing in the region between a pair of opposing planes including an optical plane and an imaging plane is the air. As shown in FIG. 11, the surface denoted by ri (i=1, 2, 3, . . . ) indicates the i-th lens surface from the object side on the optical path, and the surface ri marked with an asterisk (*) is an aspherical surface, namely, a refractive optical plane of an aspherical configuration or a plane having a refractive power substantially equivalent to the action of an aspherical plane.

As is obvious from Table 1, in Example 1, the both surfaces of the lens element (LP1) closest to the object, the both surfaces of the fifth lens element (L5), and the both surfaces of the lens element (LP2) closest to the image sensor are aspherical. Further, since the aperture stop (ST), the both surfaces of the plane parallel plate (PL), and the

TABLE 1

| LENS SURFACE No. | RADIUS OF CURVATURE (mm) | AXIAL DISTANCE BETWEEN SURFACES (INFINITE FOCAL POINT, mm) | | | REFRACTIVE INDEX | ABBE NUMBER |
|---|---|---|---|---|---|---|
| | | W | M | T | | |
| OBJECT | — | | | | | |
| r1* | −8.591 | ∞ | ∞ | ∞ | | |
| r2* | −16.102 | 7.181 | | | 1.58340 | 30.23 |
| r3 | −5.670 | 1.019 | 1.826 | 0.656 | | |
| r4 | 5.934 | 0.574 | | | 1.67603 | 54.67 |
| r5 | 5.934 | 0.008 | | | 1.51400 | 42.83 |
| r6 | −41.351 | 1.336 | | | 1.84828 | 33.62 |
| r7 | | 5.462 | 1.713 | 0.100 | | |
| r8 | 8.031 | 0.574 | | | | |
| r9 | 3.690 | 3.400 | | | 1.84666 | 23.82 |
| r10 | 3.690 | 0.008 | | | 1.51400 | 42.83 |
| r11 | −89.291 | 1.488 | | | 1.64275 | 56.36 |
| r12* | 3.741 | 0.100 | | | | |
| r13* | 4.610 | 3.393 | | | 1.51342 | 66.94 |
| r14* | 11.242 | 1.076 | 3.861 | 6.645 | | |
| r15* | −25.187 | 6.468 | | | 1.51680 | 64.20 |
| r16 | ∞ | 0.483 | | | | |
| r17 | ∞ | 0.500 | | | 1.51680 | 64.20 |
| r18 | ∞ | 0.500 | | | | |

TABLE 2

| LENS SURFACE No. | CONICAL COEFFICIENT | ASPHERIC COEFFICIENT | | | | |
|---|---|---|---|---|---|---|
| | | A | B | C | D | E |
| r1* | 0.098636 | 1.39E−03 | −3.05E−05 | 1.65E−06 | −5.70E−08 | 8.64E−10 |
| r2* | 0 | 7.89E−04 | −5.99E−05 | 8.21E−06 | −4.19E−07 | 0.00E+00 |
| r12* | 0 | 2.59E−04 | −9.52E−05 | 1.55E−05 | −1.26E−06 | 0.00E+00 |
| r13* | 0 | 6.42E−03 | 1.61E−04 | 4.99E−05 | 6.34E−06 | 0.00E+00 |
| r14* | 0 | 1.62E−03 | −1.07E−04 | 1.34E−05 | −5.19E−07 | 0.00E+00 |
| r15* | 0 | 7.00E−03 | −3.18E−05 | −5.79E−05 | 5.71E−06 | 0.00E+00 | light receiving plane of the image sensor (SR) are flat, respective radii of curvature thereof are infinite (∞). In this example, the first reflecting prism (PR1) is made of a plastic material, and the optical devices other than the first reflecting prism (PR1) are made of a glass material.

The aspherical configuration of the optical device is defined by the following conditional formula (3), wherein the apex of the lens surface is represented as the point of origin, and a local orthogonal coordinate system (x, y, z), with the direction from the object toward the image sensor being the positive z-axis direction is used.

$$z = \frac{c \cdot h^2}{1 + \sqrt{1-(1+k)c^2 \cdot h^2}} + A \cdot h^4 + B \cdot h^6 + C \cdot h^8 + D \cdot h^{10} + E \cdot h^{12} \quad (3)$$

z represents a z-axis displacement at the height position h relative to the apex of the lens surface, h represents a height in a direction perpendicular to the z-axis ($h^2=x^2+y^2$).

c represents a curvature near the apex of the lens surface (=1/radius of curvature), A, B, C, D, and E respectively represent aspheric coefficients of 4th, 6th, 8th, 10th, and 12th orders, and k represents a conical coefficient. Table 2 shows the conical coefficient k, and the aspheric coefficients A, B, C, D, and E. As is obvious from the conditional formula (3), the radii of curvature of the respective aspheric lens elements in Table 1 each show a value approximate to the center of the corresponding lens element.

The spherical aberration (LONGITUDINAL SPHERICAL ABERRATION in FIGS. 17A, 17D, and 17G), the astigmatism (ASTIGMATISM in FIGS. 17B, 17E, and 17H), and the distortion aberration (DISTORTION in FIGS. 17C, 17F, and 17I) of the optical system in Example 1 comprised of the first through the fourth lens groups and having the above lens arrangement and construction are shown in FIGS. 17A through 17I. Specifically, the respective aberrations at the wide-angle limit (W), the mid point (M), and the telephoto limit (T) are shown in the uppermost row, the intermediate row, and the lowermost row in FIGS. 17A through 17I. Each of the horizontal axes in the spherical aberration diagrams and the astigmatism diagrams shows a focal point displacement in the unit of mm. Each of the horizontal axes in the distortion aberration diagrams shows a distortion in terms of percentage. Each of the vertical axes in the spherical aberration diagrams shows a value standardized by the incident height, and each of the vertical axes in the astigmatism diagrams and the distortion aberration diagrams shows a height of an optical image or an image height in the unit of mm.

In the spherical aberration diagrams, aberrations in case of using light of three different wavelengths are shown, wherein the one-dotted-chain lines represent aberrations in a red ray (wavelength: 656.27 nm), the solid lines represent aberrations in a yellow ray (so-called "d-ray" having a wavelength of 587.56 nm), and the broken lines represent aberrations in a blue ray (wavelength: 435.83 nm). In the astigmatism diagrams, the dashed lines "T" and the solid lines "S" respectively represent displacements (unit: mm, represented by the horizontal axes) of a tangential (meridional) plane and a sagittal (radial) plane near the apex of the lens surface in the direction of the optical axis (AX). Further, the astigmatism diagrams and the distortion aberration diagrams show results of using the yellow ray or d-ray.

As is obvious from FIGS. 17A through 17I, the zoom optical system 51 in Example 1 exhibits superior optical characteristics, wherein the spherical aberration, the astigmatism, and the distortion aberration are significantly small at all the positions, namely at the wide-angle limit (W), the mid point (M), and the telephoto limit (T). The focal length (unit: mm), and the F-number at the wide-angle limit (W), the mid point (M), and the telephoto limit (T) in Example 1 are shown in Tables 7 and 8, respectively. Tables 7 and 8 show that Example 1 provides a fast optical system of a short focal length.

Example 2

Construction data on the respective lens elements in the zoom optical system 52 as the second embodiment (Example 2) are described in Tables 3 and 4. As is obvious from Tables 3 and 4, in Example 2, the both surfaces of the lens element (LP1) closest to the object, the imaging-side surface of the second lens element (L2), the object-side surface of the third lens element (L3), the both surfaces of the fifth lens element (L5), and the both surfaces of the lens element (LP2) closest to the image sensor are aspherical. In this example, the first reflecting prism (PR1) is made of a plastic material, and the optical devices other than the first reflecting prism (PR1) are made of a glass material.

TABLE 3

| LENS SURFACE No. | RADIUS OF CURVATURE (mm) | AXIAL DISTANCE BETWEEN SURFACES (INFINITE FOCAL POINT, mm) | | | REFRACTIVE INDEX | ABBE NUMBER |
|---|---|---|---|---|---|---|
| | | W | M | T | | |
| OBJECT | — | | | | | |
| r1* | −6.031 | ∞ | ∞ | ∞ | | |
| r2* | −5.498 | 7.424 | | | 1.58340 | 30.23 |
| r3 | −4.923 | 0.741 | | | | |
| r4 | 29.654 | 0.574 | | | 1.72858 | 52.48 |
| r5 | 29.654 | 0.008 | | | 1.51400 | 42.83 |
| r6* | −51.572 | 2.347 | | | 1.84666 | 23.82 |
| r7 | ∞ | 6.596 | 2.807 | 0.100 | | |
| r8* | 5.564 | 0.574 | | | | |
| r9 | 3.201 | 2.000 | | | 1.84666 | 23.82 |
| r10 | 3.201 | 0.008 | | | 1.51400 | 42.83 |
| r11 | −21.826 | 1.627 | | | 1.51389 | 66.89 |
| r12* | 4.500 | 0.100 | 1.840 | 0.791 | | |
| r13* | 5.154 | 3.200 | | | 1.51680 | 64.20 |

TABLE 3-continued

| LENS SURFACE No. | RADIUS OF CURVATURE (mm) | AXIAL DISTANCE BETWEEN SURFACES (INFINITE FOCAL POINT, mm) | | | REFRACTIVE INDEX | ABBE NUMBER |
|---|---|---|---|---|---|---|
| | | W | M | T | | |
| r14* | 96.914 | 2.587 | 4.637 | 8.393 | | |
| r15* | −6.517 | 6.583 | | | 1.51680 | 64.20 |
| r16 | ∞ | 0.000 | | | | |
| r17 | ∞ | 0.500 | | | 1.51680 | 64.20 |
| r18 | ∞ | 0.500 | | | | |

TABLE 4

| LENS SURFACE No. | CONICAL COEFFICIENT | ASPHERIC COEFFICIENT | | | | |
|---|---|---|---|---|---|---|
| | | A | B | C | D | E |
| r1* | −0.599782 | 2.00E−03 | −1.02E−05 | −1.49E−06 | 7.60E−08 | −1.42E−09 |
| r2* | 0 | 2.27E−03 | −5.45E−07 | −2.58E−06 | 2.51E−08 | 0.00E+00 |
| r6* | 0 | −9.01E−04 | 2.65E−05 | −8.48E−07 | 1.81E−07 | 0.00E+00 |
| r8* | 0 | −7.51E−05 | 5.04E−05 | −1.29E−05 | 1.38E−06 | 0.00E+00 |
| r12* | 0 | 6.51E−04 | −8.51E−05 | 2.54E−05 | −1.64E−06 | 0.00E+00 |
| r13* | 0 | 4.58E−03 | −8.90E−05 | 8.22E−05 | −3.64E−06 | 0.00E+00 |
| r14* | 0 | 2.85E−04 | 1.10E−04 | −2.29E−05 | 1.52E−06 | 0.00E+00 |
| r15* | 0 | 9.83E−03 | −8.55E−04 | 4.91E−05 | −1.20E−06 | 0.00E+00 |

Example 3

Construction data on the respective lens elements in the zoom optical system 53 as the third embodiment (Example 3) are described in Tables 5 and 6. As is obvious from Tables 5 and 6, in Example 3, the object-side surface of the lens element (LP1) closest to the object, the imaging-side surface of the second lens element (L2), the object-side surface of the third lens element (L3), the object-side surface of the fifth lens element (L5), and the both surfaces of the lens element (LP2) closest to the image sensor are aspherical. In this example, the first reflecting prism (PR1) is made of a plastic material, and the optical devices other than the first reflecting prism (PR1) are made of a glass material.

TABLE 5

| LENS SURFACE No. | RADIUS OF CURVATURE (mm) | AXIAL DISTANCE BETWEEN SURFACES (INFINITE FOCAL POINT, mm) | | | AXIAL DISTANCE BETWEEN SURFACES (CLOSEST FOCAL POINT, mm) | | | REFRACTIVE INDEX | ABBE NUMBER |
|---|---|---|---|---|---|---|---|---|---|
| | | W | M | T | W | M | T | | |
| OBJECT | — | | | | | | | | |
| r1* | −10.245 | ∞ | ∞ | ∞ | 200 | 200 | 200 | | |
| r2 | −3.765 | 8.047 | | | | | | 1.58340 | 30.23 |
| r3 | −3.765 | 0.030 | | | | | | 1.51400 | 42.83 |
| r4 | 10.431 | 0.574 | | | | | | 1.82757 | 54.06 |
| r5 | 10.431 | 0.008 | | | | | | 1.51400 | 42.83 |
| r6* | −595.348 | 2.919 | | | | | | 1.84666 | 23.82 |
| r7 | ∞ | 6.161 | 2.225 | 0.100 | 6.532 | 2.476 | 0.338 | | |
| r8* | 5.109 | 0.574 | | | | | | | |
| r9 | 2.989 | 2.000 | | | | | | 1.84666 | 23.82 |
| r10 | 2.989 | 0.008 | | | | | | 1.51400 | 42.83 |
| r11 | −36.604 | 1.446 | | | | | | 1.54742 | 63.28 |
| r12* | 9.589 | 2.699 | 4.307 | 3.765 | 2.328 | 4.056 | 3.527 | | |
| r13 | −34.549 | 4.400 | | | | | | 1.51680 | 64.20 |
| r14* | 34.039 | 0.513 | 2.841 | 5.508 | 0.513 | 2.841 | 5.508 | | |
| r15* | 8.742 | 5.439 | | | | | | | |
| r16 | ∞ | 1.182 | | | | | | | |
| r17 | ∞ | 0.500 | | | | | | 1.51680 | 64.20 |
| r18 | ∞ | 0.500 | | | | | | | |

TABLE 6

| LENS SURFACE No. | CONICAL COEFFICIENT | ASPHERIC COEFFICIENT | | | | |
|---|---|---|---|---|---|---|
| | | A | B | C | D | E |
| r1* | −0.729266 | 1.10E−03 | −1.56E−05 | 5.33E−07 | −1.75E−08 | 2.93E−10 |
| r6* | 0 | 1.25E−04 | 5.99E−05 | −1.74E−05 | 1.08E−06 | 0.00E+00 |
| r8* | 0 | −1.93E−04 | 4.85E−05 | −2.14E−05 | 3.59E−06 | 0.00E+00 |
| r12* | 0 | −1.14E−04 | 3.34E−05 | −6.98E−07 | −9.94E−09 | 0.00E+00 |
| r14* | 0 | −9.69E−04 | −3.47E−05 | −1.61E−05 | 9.67E−07 | 0.00E+00 |
| r15* | 0 | 3.49E−03 | −1.65E−04 | −2.82E−05 | 1.97E−06 | 0.00E+00 |

Spherical aberrations, astigmatisms, and distortion aberrations of the optical systems in Examples 2 and 3 having the above lens arrangements and constructions are shown in FIGS. 18A through 20I. FIGS. 18A through 19I are aberrations in Examples 2 and 3 at the infinite focal point, and FIGS. 20A through 20I are aberrations in Example 3 at the closest focal point. As is obvious from FIGS. 18A through 20I, the zoom optical systems 52 and 53 in Examples 2 and 3 exhibit superior optical characteristics, wherein the spherical aberration, the astigmatism, and the distortion aberration are significantly small at all the positions, namely, at the wide-angle limit (W), the mid point (M), and the telephoto limit (T).

The focal length (unit: mm) and the F-number at the wide-angle limit (W), the mid point (M), and the telephoto limit (T) in Examples 2 and 3 are shown in Tables 7 and 8, respectively. Tables 7 and 8 show that Examples 2 and 3 each provide a fast optical system, as well as Example 1.

TABLE 7

| | FOCAL LENGTH (mm) | | |
|---|---|---|---|
| | W | M | T |
| EXAMPLE 1 | 4.9 | 7.4 | 9.8 |
| EXAMPLE 2 | 4.9 | 7.4 | 10.8 |
| EXAMPLE 3 | 4.9 | 7.4 | 9.6 |

TABLE 8

| | F NUMBER | | |
|---|---|---|---|
| | W | M | T |
| EXAMPLE 1 | 3.1 | 3.8 | 4.5 |
| EXAMPLE 2 | 3.3 | 4.0 | 5.0 |
| EXAMPLE 3 | 3.9 | 4.6 | 5.0 |

In Examples 1 through 3, the arrangement relation between the second prism (PR2) and the image sensor (SR) is defined as shown in Table 9 to miniaturize the zoom optical system 51 (52 or 53). Specifically, the height a (unit: mm) of the light receiving plane of the image sensor (SR) on the plane where the optical path of the image sensor (SR) is folded, which corresponds to the plane of FIG. 10 (FIG. 12 or FIG. 14), the distance d (unit: mm) between the exit surface (S6) of the second reflecting prism (PR2) and the light receiving plane of the image sensor (SR), and the respective calculation results of the conditional formula (1) in Examples 1 through 3 are as shown in Table 9.

TABLE 9

| | HEIGHT (a) OF LIGHT RECEIVING SURFACE OF IMAGE SENSOR ON PLANE WHERE OPTICAL PATH IS FOLDED | DISTANCE (d) BETWEEN EXIT SURFACE OF SECOND REFLECTING PRISM AND LIGHT RECEIVING SURFACE OF IMAGE SENSOR | d/a |
|---|---|---|---|
| EXAMPLE 1 | 3.440 | 1.484 | 0.431 |
| EXAMPLE 2 | 3.440 | 1.000 | 0.291 |
| EXAMPLE 3 | 3.440 | 2.182 | 0.634 |

Further, in Examples 1 through 3, the second reflecting prisms (PR2) respectively satisfying the parameters as shown in Table 10 are adopted to optimize the size or the length of the second reflecting prisms (PR2). Specifically, the refractive index n of the second reflecting prism (PR2), the distance t of the principal ray, the exit pupil distance p, and the respective calculation results of the conditional formula (2) in Examples 1 through 3 are as shown in Table 10, wherein the units of the parameters t and p are mm.

TABLE 10

| | EXAMPLE 1 | EXAMPLE 2 | EXAMPLE 3 |
|---|---|---|---|
| | (WIDE ANGLE LIMIT) | (WIDE ANGLE LIMIT) | (WIDE ANGLE LIMIT) |
| REFRACTIVE INDEX (n) | 1.517 | 1.517 | 1.517 |
| DISTANCE (t) OF PRINCIPAL RAY | 6.468 | 6.583 | 5.439 |
| EXIT PUPIL DISTANCE (p) | −15.560 | −85.726 | −10.440 |
| (t · n)/p | −0.631 | −0.116 | −0.790 |
| | (MID POINT) | (MID POINT) | (MID POINT) |
| REFRACTIVE INDEX (n) | 1.517 | 1.517 | 1.517 |
| DISTANCE (t) OF PRINCIPAL RAY | 6.468 | 6.583 | 5.439 |
| EXIT PUPIL DISTANCE (p) | −27.400 | 81.853 | −12.609 |
| (t · n)/p | −0.358 | 0.122 | +0.654 |
| | (TELEPHOTO LIMIT) | (TELEPHOTO LIMIT) | (TELEPHOTO LIMIT) |
| REFRACTIVE INDEX (n) | 1.517 | 1.517 | 1.517 |
| DISTANCE (t) OF PRINCIPAL RAY | 6.468 | 6.583 | 5.439 |

TABLE 10-continued

|  | EXAMPLE 1 | EXAMPLE 2 | EXAMPLE 3 |
|---|---|---|---|
| EXIT PUPIL DISTANCE (p) | −57.010 | −41.316 | −12.772 |
| (t · n)/p | −0.172 | −0.242 | −0.646 |

The zoom optical systems 51, 52, and 53 in Examples 1 through 3 adopt the parameters shown in Tables 9 and 10. This arrangement enables to reduce the size of the zoom optical system 51 (52 or 53) in the thickness direction thereof corresponding to the direction of the arrows L' in FIG. 10, which securely contributes to miniaturization of the digital apparatus in the thickness direction thereof.

In the first through the third Examples, the first reflecting prism (PR1) is made of a plastic material, and the optical devices other than the first reflecting prism (PR1) are made of a glass material. Examples of the invention are not limited to this. It is possible to make a first reflecting prism (PR1) and a second reflecting prism (PR2) of a plastic material, or it is possible to make a part or the entirety of the optical devices including a lens element between the first reflecting prism (PR1) and the second reflecting prism (PR2) of a plastic material, as well as the first reflecting prism (PR1) and the second reflecting prism (PR2). For instance, using a plastic lens element or plastic lens elements for zooming is advantageous in reducing a load to a lens driver. Such an arrangement contributes to further miniaturization of the entirety of the imaging lens device including a lens group and a lens driver. Further, a plastic lens element is superior to a glass lens element in the aspect of production cost and productivity.

As described above, since the zoom optical systems 51 through 53 in the first through the third embodiments are compact and lightweight, these optical systems are suitable to be mounted in a digital apparatus, particularly, in a portable apparatus such as the camera phone 200. Further, since the inventive zoom optical systems have high optical performance compatible with a high-resolution image sensor having two million pixels or more, these optical systems are superior to electronic zoom systems which require interpolation.

The invention can take the following modifications in addition to or in place of the foregoing embodiments.

In the zoom optical systems of the foregoing embodiments, it is possible to use a cam or a stepping motor in driving the respective lens groups, the aperture stop or the shutter. In the case where a moving amount of the respective lens elements is small or a lens group to be driven is relatively lightweight, it is possible to use a micro-miniature piezoelectric actuator. Such a modification enables to drive the lens groups independently of each other while reducing the size of the driving section or suppressing increase of power consumption, which contributes to further miniaturization of the digital apparatus.

In the foregoing embodiments, the object-side surface of the first reflecting prism and the imaging-side surface of the second reflecting prism are disposed away from each other at a farthest position in the direction of the arrows A to miniaturize the optical system. Alternatively, it is possible to dispose the object-side surface of the first reflecting prism and the imaging-side surface of the second reflecting prism at a closest position in the direction of the arrows A, namely, in a region on the same side of the first reflecting prism and the second reflecting prism.

The following is a brief description of the embodiments of the invention.

(1) A zoom optical system comprises two reflecting prisms each of which is adapted to bend an incident ray at a predetermined angle for reflection, and at least one lens group including one or more lens elements arranged between the two reflecting prisms, wherein an incident surface of the reflecting prism disposed on a side of a subject on an optical path, and an exit surface of the other reflecting prism are aligned substantially parallel to each other, the incident surface or the exit surface of at least one of the reflecting prisms has an optical power, an optical axis of the lens group and an axis of the optical path between the reflecting prisms are coincident with each other, and the lens group is movable in a direction of the optical axis thereof for zooming.

According to the arrangement (1), zooming is performed by moving the lens group arranged between the two reflecting prisms in the optical axis direction of the lens group. This arrangement enables to reduce a driving force required for a driving section for zooming, as compared with an arrangement of driving the entirety of a zoom optical system, which contributes to miniaturization of the driving section. Also, since spherical aberration and field curvature can be corrected by the lens element disposed between the two reflecting prisms, optical performance of the zoom optical system can be enhanced. Further, since there is no likelihood that the thickness of the optical system may be varied in zooming, this arrangement enables to realize a thin, compact zoom optical system having high optical performance and loadable in a mobile phone or a personal digital assistant (PDA).

(2) Preferably, the zoom optical system may be configured in such a manner that the incident ray is bent on the reflecting prism at about 90 degrees.

According to the arrangement (2), since the incident angle is bent on the reflecting prism at about 90 degrees, a compact zoom optical system is realized.

(3) Preferably, the zoom optical system may be configured in such a manner that at least one of the incident surface and the exit surface of the each of the reflecting prisms has an optical power.

According to the arrangement (3), the at least one of the incident surface and the exit surface of the reflecting prism has an optical power, and the reflecting prism has not only a reflecting function but also a function equivalent to a lens element. This arrangement enables to reduce the number of parts constituting the optical system, as compared with an arrangement of realizing these functions by using individual optical devices, which contributes to further miniaturization of the zoom optical system.

(4) Preferably, the zoom optical system may be configured in such a manner that the incident surface and the exit surface of the each of the reflecting prisms have an optical power.

According to the arrangement (4), the incident surface and the exit surface of the reflecting prism have an optical power, and the reflecting prism has not only a reflecting function but also a function equivalent to a lens element. This arrangement enables to reduce the number of parts constituting the optical system, as compared with an arrangement of realizing these functions by using individual optical devices, which contributes to further miniaturization of the zoom optical system.

(5) Preferably, the zoom optical system may further comprise an aperture stop on the side of the exit surface of the reflecting prism disposed on the subject side on the optical path, wherein at least the incident surface of the reflecting prism disposed on the subject side on the optical path has a negative optical power.

According to the arrangement (5), the reflecting prism itself can be miniaturized. Specifically, it is desirable to propagate an incident ray onto an outermost peripheral area of the reflecting prism closer to parallel with the optical axis in order to miniaturize the reflecting prism. In the case where the aperture stop is located on the exit-surface side of the reflecting prism disposed on the subject side on the optical path, it is easy to make the incident ray parallel with the optical axis by giving a negative optical power to the incident surface of the reflecting prism. This arrangement enables to reduce the size of the reflecting prism, which contributes to miniaturization of the zoom optical system.

(6) Preferably, the zoom optical system may be configured in such a manner that at least two lens groups are arranged between the reflecting prisms, and that the at least two lens groups each include one or more lens elements.

According to the arrangement (6), since the at least two lens groups each including one or more lens elements are provided between the two reflecting prisms, the at least two lens groups are allowed to have functions of a variator lens group and a compensator lens group, which are required for zooming, respectively. This arrangement enables to realize a high-quality zoom optical system.

(7) Preferably, the zoom optical system may be configured in such a manner that the at least two lens groups are moved in a direction of the optical axis thereof for zooming.

According to the arrangement (7), since the at least the two lens groups are allowed to have functions of a variator lens group and a compensator lens group, which are required for zooming, respectively, a high-quality zoom optical system is realized. Also, zooming is performed by moving the at least two lens groups in the optical axis direction thereof. This arrangement enables to reduce the moving distances of the respective lens groups, as compared with an arrangement of moving a single lens group, which contributes to miniaturization of the optical system.

(8) Preferably, the zoom optical system may be configured in such a manner that the at least one lens group is moved in a direction of the optical axis thereof for focusing.

According to the arrangement (8), focusing is performed by moving the at least one lens group arranged between the two reflecting prisms in the optical axis direction of the lens group. This arrangement enables to reduce a driving force required for a driving section for focusing, as compared with an arrangement of driving the entirety of a zoom optical system, which contributes to miniaturization of the driving section. Also, since the reflecting prism is not driven, a drawback such as misalignment of the optical axis can be eliminated, thereby securing positional precision of the reflecting prism. Further, since there is no likelihood that the thickness of the optical system is varied in focusing, the optical system can retain its small thickness in zooming.

(9) Preferably, the zoom optical system may be configured in such a manner that at least one of the two reflecting prisms is made of a resin material.

According to the arrangement (9), since the at least one reflecting prism is made of a resin material, this arrangement enables to provide a lightweight, inexpensive, and mass-producible optical system, as compared with an arrangement provided with a reflecting prism made of a glass material.

(10) Preferably, the zoom optical system may be configured in such a manner that a water absorption coefficient of the resin material constituting the reflecting prism is 0.01% or smaller.

According to the arrangement (10), since the reflecting prism is made of a resin material with a water absorption coefficient of 0.01% or smaller, this arrangement enables to realize a zoom optical system free of an influence of an optical characteristic such as a refractive index accompanied by moisture absorption in the reflecting prism.

(11) Preferably, the zoom optical system may be configured in such a manner that the reflecting prism is produced by glass molding.

According to the arrangement (11), the reflecting prism having high precision performance and a high refractive index is easily produced by glass molding. This arrangement enables to provide a zoom optical system which is effective in shortening the optical path length or in suppressing occurrence of aberration on a refractive surface of the reflecting prism.

(12) Preferably, the zoom optical system may be configured in such a manner that a reflecting surface of the reflecting prism is flat, and the incident surface and the exit surface of the reflecting prism other than the reflecting surface are symmetrical to each other with respect to the optical axis.

According to the arrangement (12), since the optical system is symmetrical with respect to the optical axis, the optical system can be produced easily. Also, as compared with an optical system asymmetrical with respect to an optical axis, this arrangement requires less assembling evaluation and less positional adjustment, which contributes to production cost reduction.

(13) Preferably, the zoom optical system may further comprise an optical device having an optical power on the optical path between the incident surface of the reflecting prism disposed on the subject side on the optical path, and the exit surface of the other reflecting prism, wherein the optical device includes the reflecting prism.

According to the arrangement (13), the optical device including the reflecting prism and having an optical power is arranged between the incident surface of the reflecting prism disposed on the subject side on the optical path, and the exit surface of the other reflecting prism. This arrangement enables to reduce the thickness of the entirety of the optical system, as compared with an arrangement that an optical device is arranged on the subject side on the optical path with respect to the incident surface of the reflecting prism disposed on the subject side on the optical path, or on the imaging side on the optical path with respect to the exit surface of the other reflecting prism.

(14) Preferably, the zoom optical system may be configured in such a manner that the other reflecting prism has an infrared ray blocking function to reduce an infrared component included in the incident ray.

According to the arrangement (14), in the case where an optical image of an incident ray passing through the zoom optical system is captured by an image sensor, the infrared component, which may cause image degradation, can be reduced by the additional function of the reflecting prism. This arrangement enables to eliminate use of an optical component for blocking an infrared ray. This arrangement enable to simplify the arrangement of the zoom optical system, which contributes to miniaturization of the zoom optical system.

(15) Preferably, an imaging lens device may comprise the zoom optical system having the arrangement (1), and the zoom optical system has such a configuration as to form an optical image of a subject on a predetermined imaging plane of the zoom optical system.

According to the arrangement (15), realized is a compact and superfine imaging lens device loadable in a mobile phone, a personal digital assistant (PDA), or a like apparatus.

(16) Preferably, a digital apparatus may comprise the imaging lens device having the arrangement (15), an image sensor, and a functioning section which causes the imaging lens device and the image sensor to execute at least one of shooting a still image of the subject, and shooting a moving image of the subject.

According to the arrangement (16), realized is a digital apparatus such as a mobile phone or a PDA capable of zooming in shooting a still image of the subject or in shooting a moving image of the subject, while retaining high precision performance.

(17) Preferably, the digital apparatus may be configured in such a manner that a display surface of a display provided in the digital apparatus, and a light receiving surface of the image sensor are parallel to each other, and a longer side of the display surface and a longer side of the light receiving surface are parallel to each other.

According to the arrangement (17), the display surface of the display provided in the digital apparatus, and the light receiving surface or the light receiving plane of the image sensor are parallel to each other, and the longer side of the display surface and the longer side of the light receiving surface are parallel to each other. This arrangement enables to effectively form the captured optical image on the light receiving surface of the image sensor with less likelihood that the light amount on the peripheral area of the light receiving surface is unduly reduced. This arrangement enables to display an image while maximally utilizing the display surface of the display, so that a photographer can effectively confirm the image composition in image shooting or the like.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom optical system comprising:
   a first reflecting prism configured to bend an incident ray at about 90 degrees by reflection, and having an incident surface disposed on a subject side of an optical path and an exit surface disposed on an object side of said optical path;
   a second reflecting prism configured to bend an incident ray at about 90 degrees by reflection, and having an incident surface disposed on the subject side of an optical path and an exit surface disposed on the object side of said optical path, and
   at least one lens group including one or more lens elements arranged between the exit surface of the first reflecting prism and the incident surface of the second reflecting prism,
   the incident surface of the first reflecting prism, and the exit surface of the second reflecting prism being aligned substantially parallel to each other, the incident surface or the exit surface of the first reflecting prism having an optical power, and, if the incident surface of the first reflecting prism has an optical power, the incident surface of the second reflecting prism has an optical power or, if the exit surface of the first reflecting prism has an optical power, the exit surface of the second reflecting prism has an optical power, wherein the reflecting surface of the reflecting prisms are flat, an optical axis of the lens group and an axis of the optical path between the first and second reflecting prisms being coincident with each other, the lens group being movable along the optical axis thereof for zooming.

2. The zoom optical system according to claim 1, wherein the incident surface and the exit surface of the each of the first and second reflecting prisms have an optical power.

3. The zoom optical system according to claim 1, further comprising an aperture stop on the side of the exit surface of the first reflecting prism disposed on the subject side on the optical path, wherein
   at least the incident surface of the first reflecting prism has a negative optical power.

4. The zoom optical system according to claim 1, wherein at least two lens groups are arranged between the first and second reflecting prisms, the at least two lens groups each including one or more lens elements.

5. The zoom optical system according to claim 4, wherein the at least two lens groups are moved along the optical axis thereof for zooming.

6. The zoom optical system according to claim 1, wherein the at least one lens group is moved in a direction of the optical axis thereof for focusing.

7. The zoom optical system according to claim 1, wherein at least one of the first and second reflecting prisms is made of a resin material.

8. The zoom optical system according to claim 7, wherein a water absorption coefficient of the resin material constituting the reflecting prism is 0.01% or smaller.

9. The zoom optical system according to claim 1, wherein at least one of the first and second reflecting prisms is produced by glass molding.

10. The zoom optical system according to claim 1, further comprising an optical device having an optical power on the optical path between the incident surface of the first reflecting prism, and the exit surface of the second reflecting prism.

11. The zoom optical system according to claim 1, wherein the second reflecting prism has an infrared ray blocking function to reduce an infrared component included in the incident ray.

12. An imaging lens device comprising a zoom optical system including:
   a first reflecting prism configured to bend an incident ray at about 90 degrees by reflection, and having an incident surface disposed on a subject side of an optical path and an exit surface disposed on an object side of said optical path;
   a second reflecting prism configured to bend an incident ray at about 90 degrees by reflection, and having an incident surface disposed on the subject side of an optical path and an exit surface disposed on the object side of said optical path, and
   at least one lens group including one or more lens elements arranged between the exit surface of the first reflecting prism and the incident surface of the second reflecting prism,
   the incident surface of the first reflecting prism, and the exit surface of the second reflecting prism being aligned substantially parallel to each other, the incident surface or the exit surface of the first reflecting prism having an optical power, and, if the incident surface of the first reflecting prism has an optical power, the incident surface of the second reflecting prism has an optical power or, if the exit surface of the first reflecting prism has an optical power, the exit surface of the second reflecting prism has an optical power, wherein the reflecting surface of the reflecting prisms are flat, an optical axis of the lens group and an axis of the optical path between the first and second reflecting prisms being coincident with each other, the lens group being movable along the optical axis thereof for zooming, and the zoom optical system having such a configuration as to form an optical image of a subject on a predetermined imaging plane of the zoom optical system.

13. A digital apparatus comprising:

an imaging lens device;

an image sensor; and a functioning section which causes the imaging lens device and the image sensor to execute at least one of shooting a still image of the subject, and shooting a moving image of the subject, the imaging lens device including a zoom optical system having:

a first reflecting prism configured to bend an incident ray at about 90 degrees by reflection, and having an incident surface disposed on a subject side of an optical path and an exit surface disposed on an object side of said optical path;

a second reflecting prism configured to bend an incident ray at about 90 degrees by reflection, and having an incident surface disposed on the subject side of an optical path and an exit surface disposed on the object side of said optical path, and at least one lens group including one or more lens elements arranged between the exit surface of the first reflecting prism and the incident surface of the second reflecting prism, the incident surface of the first reflecting prism, and the exit surface of the second reflecting prism being aligned substantially parallel to each other, the incident surface or the exit surface of the first reflecting prism having an optical power, and, if the incident surface of the first reflecting prism has an optical power, the incident surface of the second reflecting prism has an optical power or, if the exit surface of the first reflecting prism has an optical power, the exit surface of the second reflecting prism has an optical power, wherein the reflecting surface of the reflecting prisms are flat, an optical axis of the lens group and an axis of the optical path between the first and second reflecting prisms being coincident with each other, the lens group being movable along the optical axis thereof for zooming, and the zoom optical system having such a configuration as to form an optical image of a subject on a predetermined imaging plane of the zoom optical system.

14. The digital apparatus according to claim 13, wherein a display surface of a display provided in the digital apparatus, and a light receiving surface of the image sensor are parallel to each other, and a longer side of the display surface and a longer side of the light receiving surface are parallel to each other.

* * * * *